(12) United States Patent
Tsuda et al.

(10) Patent No.: US 8,097,192 B2
(45) Date of Patent: Jan. 17, 2012

(54) FOAMED RESIN MOLDING MACHINE AND METHOD OF OPERATING THE SAME

(75) Inventors: Akihiko Tsuda, Nakatsugawa (JP);
Tomio Nakashima, Nakatsugawa (JP);
Tomohiro Oshima, Nakatsugawa (JP);
Taizo Mio, Nakatsugawa (JP)

(73) Assignee: Daisen Industry Co., Ltd., Ageo-Shi (JP)

( * ) Notice: Subject to any disclaimer, the term of this patent is extended or adjusted under 35 U.S.C. 154(b) by 182 days.

(21) Appl. No.: 12/162,006

(22) PCT Filed: Feb. 28, 2007

(86) PCT No.: PCT/JP2007/000144
§ 371 (c)(1),
(2), (4) Date: Jul. 24, 2008

(87) PCT Pub. No.: WO2007/099713
PCT Pub. Date: Sep. 7, 2007

(65) Prior Publication Data
US 2009/0026645 A1    Jan. 29, 2009

(30) Foreign Application Priority Data

| | | |
|---|---|---|
| Mar. 2, 2006 | (JP) | 2006-056220 |
| Aug. 15, 2006 | (JP) | 2006-221363 |
| Aug. 15, 2006 | (JP) | 2006-221364 |
| Sep. 4, 2006 | (JP) | 2006-238743 |
| Oct. 10, 2006 | (JP) | 2006-276185 |
| Nov. 8, 2006 | (JP) | 2006-302657 |

(51) Int. Cl.
*B29C 45/80* (2006.01)

(52) U.S. Cl. ...... 264/40.5; 264/40.1; 425/592; 425/593; 425/451.6

(58) Field of Classification Search ................ 425/592, 425/593, 451.6
See application file for complete search history.

(56) References Cited

U.S. PATENT DOCUMENTS

| | | | | |
|---|---|---|---|---|
| 2,938,232 | A * | 5/1960 | Martin | 425/562 |
| 4,164,523 | A * | 8/1979 | Hanning | 264/28 |
| 4,828,476 | A * | 5/1989 | Yoshiharu et al. | 425/150 |
| 5,922,266 | A * | 7/1999 | Grove | 264/297.2 |
| 6,116,887 | A * | 9/2000 | Yamada et al. | 425/186 |
| 6,589,456 | B1 | 7/2003 | Maru et al. | |
| 7,210,918 | B2 | 5/2007 | Watanabe et al. | |
| 2004/0067276 | A1* | 4/2004 | Watanabe | 425/595 |

FOREIGN PATENT DOCUMENTS

| | | |
|---|---|---|
| JP | 02-133315 U1 | 11/1990 |
| JP | 05-154930 A1 | 6/1993 |
| JP | 05-193014 A1 | 8/1993 |

(Continued)

*Primary Examiner* — Yogendra Gupta
*Assistant Examiner* — Alison Hindenlang
(74) *Attorney, Agent, or Firm* — Burr & Brown

(57) ABSTRACT

A die opening and closing device for a movable die plate and a fixed die plate includes a toggle link disposed between the movable die plate and a die tightening housing, a cross head for flexing the toggle link, and a motor-driven ball screw penetrating through the die tightening housing and inserted into the cross head, and this die opening and closing device is provided with die thickness adjusting means for adjusting the die thickness S when the die is tightened by extension of the toggle link, and ball screw rotation control means for controlling constant the cracking gap, and a foamed resin molding machine is presented, together with its operating method.

5 Claims, 21 Drawing Sheets

FOREIGN PATENT DOCUMENTS

| | | |
|---|---|---|
| JP | 06-182888 A1 | 7/1994 |
| JP | 07-132517 A1 | 5/1995 |
| JP | 08-142090 A1 | 6/1996 |
| JP | 10-180884 A1 | 7/1998 |
| JP | 2000-006212 A1 | 1/2000 |
| JP | 2000-015677 A1 | 1/2000 |
| JP | 2001-121594 A1 | 5/2001 |
| JP | 2001-341182 A1 | 12/2001 |
| JP | 2002-200658 A1 | 7/2002 |
| JP | 2003-291191 A1 | 10/2003 |
| JP | 2005-280047 A1 | 10/2005 |
| JP | 2006-015551 A1 | 1/2006 |

\* cited by examiner

FOAMED RESIN MOLDING MACHINE AND METHOD OF OPERATING THE SAME

FIELD OF THE INVENTION

The present invention relates to a foamed resin molding machine for manufacturing a foamed molding, and a method of operating the same.

BACKGROUND OF THE INVENTION

The foamed resin molding machine conventionally used in the field of foaming and molding is designed in a structure consisting of a fixed die plate and a movable die plate, for opening and closing the die plates by mutually approaching or departing by piston driving operation as disclosed, for example, in patent document 1. Specifically, a die opening and closing device as shown in FIG. 5 is used, in which a piston 511 is mounted on a movable die plate 2 having a movable die 4 attached to the front face, and this piston 511 is driven by a driving cylinder 521, and the movable die 4 is moved closer to or apart from a fixed die 3 attached to a fixed die plate 1.

In such foamed resin molding machine, corresponding to the product to be foamed and molded, since the die consisting of the fixed die 3 and movable die 4 is exchanged and mounted, and the die interval when the fixed die 3 and the movable die 4 contact with each other (hereinafter called the die thickness) S varies to be wider or narrower. When the die thickness S is narrower, if the stroke of the piston 51 is sufficiently large, the movable die 4 securely contacts with the fixed die 3. However, when the die thickness S is narrower than the stroke of the piston 51, the movable die 4 does not contact with the fixed die 2, and as shown in FIG. 5, a distance piece 531 is attached to the leading end of the piston 51 to compensate for shortage of the stroke. On the other hand, when the die is exchanged, and the die thickness S is extremely wider, the distance piece 531 must be removed. The distance piece 531 is attached or detached in a narrow working space, which is a troublesome task and the machine operator may be stained with oil.

In such a die opening and closing device, usually, in the process of moving the movable die plate 4 closer, to fill the cavity formed in the die with material beads (expandable resin beads), the operation is once stopped while keeping a specified cracking gap between them, and after filling with materials, the dies are moved closer and tightened. The cracking gap is very important as an air escape route when supplying the materials into the die by air flow.

However, in the die opening and closing device of the conventional hydraulic cylinder system, since the pressing force of the movable die plate 4 fluctuates depending on the oil viscosity, temperature, speed of the movable die plate 4, or weight of the movable die 4, control of stopping position of the movable die plate 4 is unstable, errors of ±0.5 to 1.0 mm occur in the cracking gap as compared with the predetermined value, and the molding conditions are not constant.

When demolding the molding from the die, the movable die plate 4 is opened by setting a cracking gap of 5 to 50 mm from the molding, and at this time, air is being blown into the die to lift the molding from the die. In the die opening and closing device of the conventional hydraulic cylinder system, due to deviation of air blowing pressure, the cracking gap may fluctuate, and errors of ±50 to 100 mm may occur from the predetermined cracking gap. Due to such large errors, the molding cannot be transferred to the opposite die, and the molding cannot be taken out smoothly. As a result, the molding may be deformed or damaged, or pierced by an eject pin.

Patent document 1: Japanese Patent Application Laid-Open No. 1993-154930
Patent document 2: Japanese Patent Application Laid-Open No. 1994-182888
Patent document 3: Japanese Patent Application Laid-Open No. 1998-180884
Patent document 4: Japanese Patent Application Laid-Open No. 1993-193014

SUMMARY OF THE INVENTION

Problems to be Solved by the Invention

It is hence an object of the invention to present a foamed resin molding machine capable of molding and demolding the product efficiently by controlling the cracking gap at high precision when filling with raw materials or when demolding, and a method of operating the same.

Means for Solving the Problems

The foamed resin molding machine of the invention devised to solve the above problems includes a fixed die plate having a fixed die, a movable die plate having a movable die, and a die opening and closing device for opening and closing the movable die plate on the fixed die plate, in which the die opening and closing device is composed of a toggle link disposed reversely between the movable die plate and a die tightening housing, a cross head for bending and extending the toggle link, and a motor-driven ball screw penetrating through the die tightening housing to be screwed into the cross head.

In the invention, the die opening and closing device includes die thickness adjusting means for moving the die tightening housing and adjusting the thickness of the tightened die, and ball screw rotation control means for controlling the cracking gap specifically by stopping the movable die at a cracking position when tightening or opening the die.

In the foamed resin molding machine, the die thickness adjusting means is composed of a die thickness adjusting motor for moving the die tightening housing, a rotary encoder for detecting the position of movable die plate, and a controller for driving the die thickness adjusting motor, and the ball screw rotation control means is composed of an electrical motor for rotating the ball screw, a rotary encoder for detecting the rotating speed of the electrical motor, and a controller for driving the electrical motor.

The operating method of a foamed resin molding machine of the invention is an operating method of a foamed resin molding machine for tightening the die by using the foamed resin molding device described above, and is characterized by predetermining the die thickness by moving the die tightening housing by the die thickness adjusting means corresponding to the thickness of the exchanged die, determining the die tightening force at the die tightening limit, finely adjusting the die thickness by the die thickness adjusting means on the basis of the measured result, and once opening the die and then tightening the die again, by controlling the extension of the toggle link by the ball screw rotation adjusting means, and thereby controlling the cracking gap at a constant level at the time of filling with raw materials.

The operating method of a foamed resin molding machine of the invention is also an operating method of a foamed resin molding machine for opening a demolding die by using the foamed resin molding device described above, and is characterized by controlling the flexure of a toggle link by ball screw rotation control means while blowing air into the fixed die, opening the movable die to the demolding die opening cracking position, lifting the molding by air to transfer to the movable die, controlling the extension of the toggle link by ball screw rotation control means while blowing air into the movable die, tightening the movable die to the demolding die tightening cracking position, lifting the molding by air to transfer to the fixed die, and pushing and dropping the molding by the eject pin while opening the die.

The foamed resin molding machine of the invention is a foamed resin molding machine including a fixed die plate having a fixed die, a movable die plate having a movable die, and a die opening and closing device for opening and closing the movable die plate on the fixed die plate, in which the die opening and closing device is composed of a toggle link disposed between the movable die plate and a die tightening housing, and a ball screw for flexing the toggle link by way of a cross head, and the die opening and closing device is further provided with a die tightening force adjusting mechanism for measuring the die tightening force and adjusting it to a specified die tightening force.

In the above-described invention, the die tightening force adjusting mechanism is composed of measuring means of die tightening force, die thickness adjusting means for adjusting the die thickness of the die tightened by moving the die tightening housing, and a controller for commanding the correction of measured deviation of die tightening force to the die thickness adjusting means, and the measuring means of die tightening force is, for example, torque detecting means connected to the drive motor of the ball screw or elongation detecting means mounted on the tie bar, and the die thickness adjusting means is composed of a die thickness adjusting motor for moving the die tightening housing, and a rotary encoder for detecting the position of the movable die plate.

The operating method of the above-described foamed resin molding machine is characterized by tightening the die to the die tightening limit, measuring the die tightening force, moving the die tightening housing by the die thickness adjusting means if the die tightening force is not within the specified target value range, and setting the die tightening force within the specified range, and the target value can be set at 30 to 70% of the die tightening force in the actual molding process.

The foamed resin molding machine of the invention is a foamed resin molding machine including a foaming machine main body having a fixed die plate and a movable die plate, and a molding process control device connected to the molding machine main body, in which the molding machine main body has a toggle link for moving the movable die plate, and a motor-driven ball screw for flexing the toggle link, and the molding process control device has a touch panel for changing over between an idle operation for checking the molding program on a monitor screen by displaying molding parameters of the molding program of the molding machine main body, and an actual operation for producing moldings automatically.

In the above-described invention, the molding parameters include the moving speed of the movable die plate of driving by the motor-driven ball screw, and the cracking stop position of the movable die plate by stopping of the motor-driven ball screw, and the molding parameters may also include the discharge timing and discharge time and pressure of the injection air for material supply and the demolding air.

The monitor screen may show part of the molding machine main body during idle operation in equal size, magnified size or reduced size, or show numerical values of molding parameters at least in carry-up or carry-down display, or the monitor display may show the monitor checking results, either in fast feed or slow feed display, or show the check results of one cycle as a list.

The operating method of a foamed resin molding machine of the invention is also an operating method of the foamed resin molding machine described above, in which an idle operation is selected on the touch panel, and the monitor screen for checking the molding program checks the moving speed of the movable die plate by driving of the motor-driven ball screw, and the cracking stopping position of the movable die plate by stopping of the motor-driven ball screw, and also checks at least the air discharge timing, discharge time and pressure by discharging the injection air of material supply and the demolding air.

In the above-described invention, after checking the molding program by idle operation, the actual operation can be started by selecting on the touch panel, and during the actual operation, the monitor screen displays the deviation of the predetermined value of cracking stopping position and the actual value, and a warning is issued or the operation is stopped when an abnormal position exceeding the limit is detected.

The foamed resin molding machine of the invention is a foamed resin molding machine including two ball screws for moving the movable die plate, provided at mutually opposite positions of a fixed die plate and an opposite movable die plate across a die, in which a high speed moving mechanism of the movable die plate is disposed at an end of one ball screw, and a low speed moving mechanism of the movable die plate is disposed at an end of the other ball screw, and a power transmission member for transmitting the rotation of one ball screw to the other ball screw is interposed between these ball screws.

In the above-described invention, the high speed moving mechanism has a motor having a motor shaft directly coupled to the ball screw, and the low speed moving mechanism has a motor and a reduction gear for transmitting the rotation of the motor to the ball screw.

The ball screw and the reduction gear can be connected by way of a worm gear or clutch mechanism, or a straight guide may be disposed beneath the movable die plate for the ease of sliding of the movable die plate.

The high speed moving mechanism and the low speed moving mechanism can be mounted on a support plate, and the number of die plates may be reduced from three to two, and all tie bars can be omitted.

The operating method of a foamed resin molding machine of the invention is also an operating method of a foamed resin molding machine for manufacturing moldings by using the foamed resin molding machine described above, in which the die tightening force increased due to tension of the die when steam is injected into the die at the die tightening limit is lessened by automatic rotation of the motor of the low speed moving mechanism.

The operating method of a foamed resin molding machine of the invention is a filling method of materials beads in the cavity formed between the fixed die and the movable die, by injection air, by using the above-described foamed resin molding machine, in which the movable die is moved by the ball screw, and filling with material beads is started when the movable die is moved to the filling start cracking position, and then the ball screw is rotated continuously or intermittently, and the cavity is filled with material beads while narrowing the cracking gap in a stepless or in multiple-step manner.

In the above-described invention, filling with material beads is conducted in multiple steps, such as a first step of starting filling the die fitting portion of the cavity with material beads when the movable die is moved to the filling start cracking position, a second step of filling the middle portion of the cavity with material beads by narrowing the cracking cavity by one degree, a third step of filling the middle portion of the cavity with material beads by narrowing the cracking cavity by another degree, and a fourth step of finishing the die closing by closing the cracking gap.

In the process of filling the cavity with material beads while narrowing the cracking gap, the ball screw is rotated reversely to widen the cracking gap at least once, and then the ball screw is rotated normally to narrow the cracking gap, so that the material beads in the cavity may shaken by pulsation by air expansion and contraction, and the cavity may be fully filled with material beads.

After the second step, the operation may be set back at least once to the first step, and the first step and second step are repeated plural times, and by widening and narrowing of cracking gap, the material beads in the cavity may shaken by pulsation by air expansion and contraction, and the cavity may be fully filled with material beads.

The operating method of a foamed resin molding machine of the invention is an operating method of a foamed resin molding machine for opening and closing the die by normal and reverse rotation of the ball screw by using the foamed resin molding machine described above, in which after manufacturing one molding, the ball screw is rotated reversely to form a demolding cracking width of 3 to 30% of the molding height between the fixed die and the movable die, a compressed air is supplied into a steam chamber of the movable die to demold the molding from the movable die and transfer it to the fixed die, and then the molding is demolded from the fixed die. In this description, the normal rotation of the ball screw is a direction of tightening the die, and reverse rotation of the ball screw is a direction of opening the die.

In the above-described invention, the movable die is moved at a specified pitch, and the die is opened in gradual steps to the demolding cracking width, and at every move of the movable die, a compressed air can be supplied into the steam chamber of the movable die.

The movable die is opened while slowing down the speed to the demolding cracking width, and the compressed air can be supplied continuously into the steam chamber of the movable die.

The operating method of a foamed resin molding machine of the invention is an operating method of a foamed resin molding machine for opening and closing the die by normal and reverse rotations of the ball screw by using the foamed resin molding machine described above, in which after manufacturing one molding, the ball screw is rotated reversely to form a demolding cracking width of 3 to 30% of the molding height between the fixed die and the movable die, a compressed air is supplied into a steam chamber of the fixed die to demold the molding from the fixed die and transfer it to the movable die at a first step, the ball screw is rotated normally to tighten the die to the die tightening limit or to an intermediate point to the die tightening limit at a second step, and the ball screw is rotated reversely to form a demolding cracking width of 3 to 30% of the molding height between the fixed die and the movable die, a compressed air is supplied into a steam chamber of the movable die to demold the molding from the movable die and transfer it to the fixed die at a third step.

In the above-described invention, the third step may be followed by a fourth step, that is, the ball screw is rotated normally to tighten the die to the die tightening limit or to an intermediate point to the die tightening limit, and going back to the first step after the fourth step, and the operation of these steps is repeated plural times, and a high pressure can be applied to the molding interface by pulsation of air, and the molding can be demolded.

By moving the movable die by a specified pitch, and the die can be opened gradually to the demolding cracking width, and at every move of the movable die, a compressed air can be supplied into the steam chamber of the fixed die or the steam chamber of the movable die.

The movable die is opened while slowing down the speed to the demolding cracking width, and the compressed air can be supplied into the steam chamber of the fixed die or the steam chamber of the movable die.

The foamed resin molding machine of the invention is a foamed resin molding machine including a molding machine main body having a fixed die plate and a movable die plate, and a molding process control device connected to the molding machine main body, in which the molding machine main body has a motor-driven ball screw for moving the movable die plate, and the molding process control device has a touch panel for changing over between an idle operation for checking the molding program on a monitor screen by displaying molding parameters of the molding program of the molding machine main body, and an actual operation for producing moldings automatically.

In the invention, the molding parameters include the moving speed of the movable die plate by driving of the motor-driven ball screw, and the cracking stop position of the movable die plate by stopping of the motor-driven ball screw, and the molding parameters may also include the discharge timing discharge time and pressure of the injection air for material supply and the demolding air.

The monitor screen may show part of the molding machine main body during idle operation in equal size, magnified size or reduced size, or show numerical values of molding parameters at least in carry-up or carry-down display, or the monitor display may show the monitor checking results, either in fast feed or slow feed display, or show the check results of one cycle as a list.

The operating method of a foamed resin molding machine of the invention is also an operating method of the foamed resin molding machine describe above, in which an idle operation is selected on the touch panel, and the monitor screen for checking the molding program checks the moving speed of the movable die plate by driving of the motor-driven ball screw, and the cracking stopping position of the movable die plate by stopping of the motor-driven ball screw, and also checks at least the air discharge timing, discharge time and pressure by discharging the injection air of material supply and the demolding air.

In the above-described invention, after checking the molding program by idle operation, the actual operation can be started by selecting on the touch panel, and during the actual operation, the monitor screen displays the deviation of the predetermined value of cracking stopping position and the actual value, and a warning is issued or the operation is stopped when an abnormal position exceeding the limit is detected.

EFFECTS OF THE INVENTION

In the invention as set forth in claim 1, the movable die plate is moved by the toggle link flexed by a motor-driven ball screw, and compared with the conventional hydraulic cylinder system, the cracking gap can be controlled at high precision when filling with material or when demolding.

In the invention as set forth in claim 2, since the position of the die tightening housing is adjusted by the die thickness adjusting means, the die tightening force is neither too strong nor too weak. The toggle link is extended by rotation of a ball screw and ball screw rotation adjusting means, and the cracking gap in material filling can be controlled at a constant level, and fluctuations of material filling conditions can be prevented.

In the invention as set forth in claim 3, accurate adjustment of die tightening force and constant control of cracking gap can be realized.

In the invention as set forth in claim 4, flexing and extension of the toggle link at the time of demolding can be controlled by the rotation of the ball screw and the ball screw rotation control means, and the cracking gap in demolding die opening and closing can be controlled constant, and without causing large fluctuations of cracking gap due to suction of air in the conventional hydraulic cylinder, the molding can be taken out smoothly.

In the invention as set forth in claim 5, the die tightening force can be set within a target range by the die tightening force adjusting mechanism.

In the invention as set forth in claim 6, if the die tightening force is out of a target range, the die tightening force can be adjusted within a specified range by the die tightening force adjusting mechanism.

In the invention as set forth in claim 7, in the above-described foamed resin molding machine, the touch panel can select between an idle operation for checking the parameters of molding program on a monitor screen, and an actual operation for producing moldings automatically.

In the invention as set forth in claim 8, the monitor screen preliminarily shows molding parameters such as the moving speed of movable die plate, cracking stopping position, discharge timing, discharge time and pressure of injection air and demolding air and others, and the target values can be set.

In the invention as set forth in claim 9, two ball screws are individually provided with high speed moving mechanism and low speed moving mechanism, and a power transmission member is interposed between these ball screws, and the high speed moving mechanism is operated when starting the die closing operation, and the two ball screws are rotated at high speed, and the movable die plate can be moved at high speed. Before the die closing limit, the high speed moving mechanism is stopped, and the low speed moving mechanism is started, and the two ball screws are rotated at low speed, and the movable die plate can be moved by a low speed and high tightening force. Therefore, by changing over the driving of moving mechanisms, the movable die plate can be closed securely.

In the invention as set forth in claim 10, since the stress caused by expansion of die is released automatically, the ball screw is not overloaded.

In the invention as set forth in claim 11, the ball screw is rotated continuously or intermittently, and the cavity is filled with material beads while narrowing the cracking gap in a stepless or multiple-step manner, and it is not required to close the die for eliminating the cracking gap after filling with the material. Hence, the cavity is not overfilled with material beads.

In the invention as set forth in claim 12, since the cracking width is set by the ball screw mechanism, the cracking width can be set at high precision by the ball screw position holding function. Therefore, the cracking width is narrower than before, and a high pressure may be easily applied to the molding interface at the movable die side (hereinafter called the molding front side; the molding interface at the fixed die side is called the molding backside), and consumption of compressed air is saved, and the molding can be demolded from the die favorably.

In the invention as set forth in claim 13, the cracking width is set small and at high precision by the ball screw position holding function, and the molding can be demolded in the first to third steps. Hence, consumption of compressed air is saved, and the molding can be demolded securely form the die.

In the invention as set forth in claim 14, by the selection on the touch panel, the idle operation for checking the parameters of the molding program and the actual operation for producing the moldings automatically can be changed over on the monitor screen.

In the invention as set forth in claim 15, on the monitor screen, the molding parameters such as moving speed of a movable die plate, cracking stopping position, and discharge timing/discharge time/pressure of injection air and demolding air can be preliminarily monitored and set to the target values

DESCRIPTION OF THE REFERENCE NUMERALS

Figure 1:
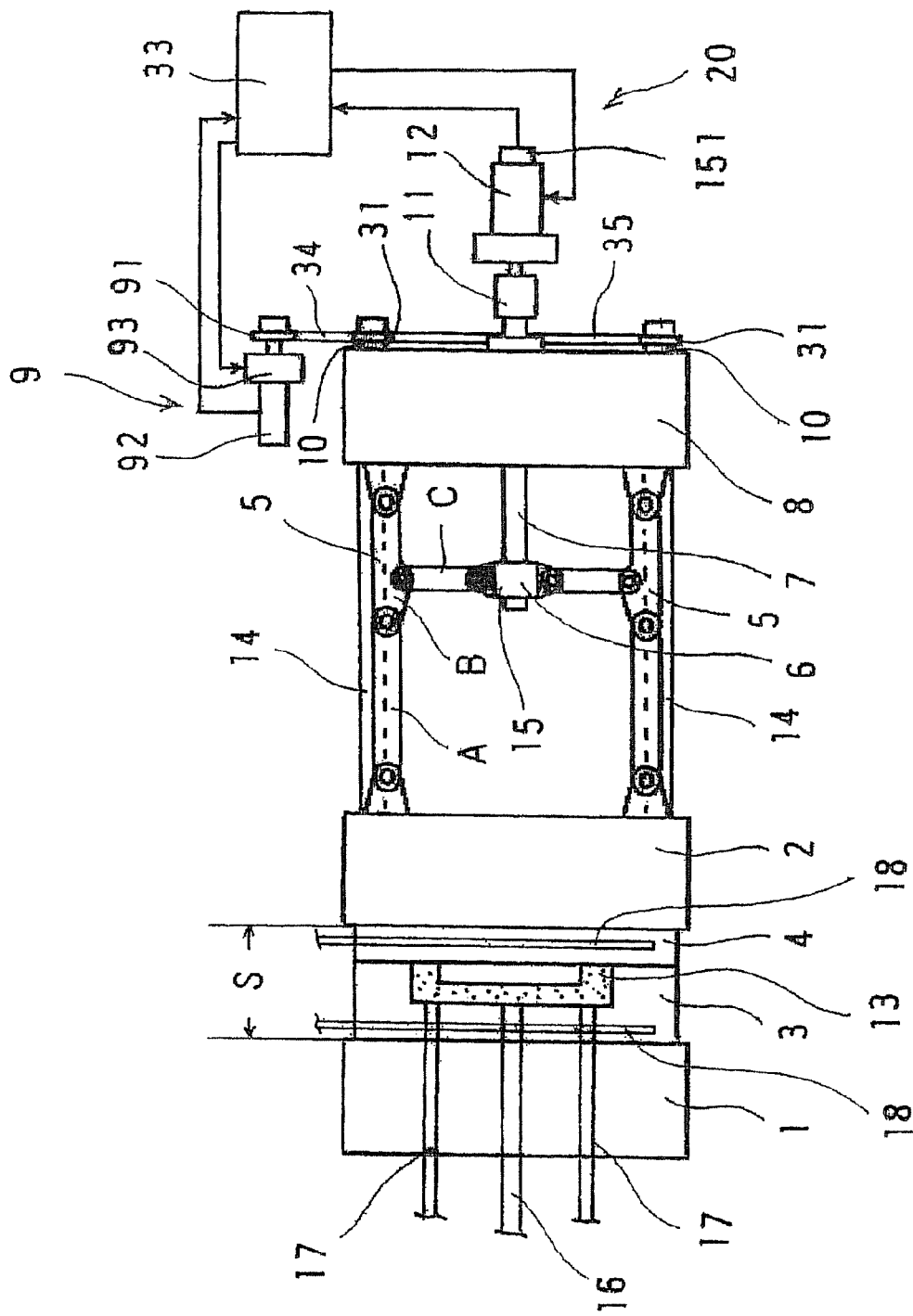
FIG. 1 is a schematic outline diagram of a foamed resin molding machine having a die opening and closing device of the invention.

1 Fixed die plate
2 Movable die plate
3 Fixed die
4 Movable die
5 Toggle link
6 Cross head
7 Ball screw
8 Die tightening housing
9 Die thickness adjusting means
20 Ball screw rotation control means
S Die thickness

DETAILED DESCRIPTION OF THE INVENTION

First Embodiment

A first embodiment of the invention is described below.

FIG. 1 is a schematic outline diagram of a foamed resin molding machine having a die opening and closing device of the invention. In FIG. 1, a movable die plate 2 is disposed reversely to a fixed die plate 1, and a die tightening housing 8 is disposed at the right side of the movable die plate 2 in the drawing.

The fixed die plate 1 is provided with a fixed die 3, and the movable die plate 2 is provided with a movable die 4. A cavity 13 is formed in the die consisting of the fixed die 3 and movable die 4. The fixed die 3 is provided with a material feeder 16, and an eject pin 17 for extruding the molding, penetrating through the fixed die plate 1. The fixed die 3 and the movable die 4 are individually provided with a piping 18 for supplying water, steam, and air inside.

Four tie bars 14 are disposed, penetrating through the movable die plate 2 and the die tightening housing 8, and the die tightening housing 8 is positioned by adjusting nuts 10 fitted to the ends of the tie bars 14. Small gears 31 are provided coaxially on the adjusting nuts 10, and the small gears 31 of the four tie bars 14 are engaged with large gears 35. Chains may be used instead of the gears 31, 35.

Near the tightening housing 8, die thickness adjusting means 9 is disposed. The die thickness adjusting means 9 includes a die thickness adjusting motor 93, and a rotary encoder 92 for detecting the position of the movable die plate 2, and a drive gear 91 mounted on the rotary shaft of the adjusting motor 93 is engaged with a large gear 35 by way of an intermediate gear 34. In such configuration, when the die thickness adjusting motor 93 is put in operation, the rotation of the drive gear 91 is transmitted to the large gear 35, and the small gears 31 put into rotation together. Each adjusting nut 10 moves back and forth along the threaded portions of each tie bar 14, and the movable die plate 2 also moves back and forth, and its longitudinal direction position can be adjusted.

Meanwhile the rotary encoder 92 detects the rotating speed of the die thickness adjusting motor 93, and hence detects the position of the movable die plate 2. Or, the rotary encoder 92 can be attached to the movable die plate 2, and by rotating the rotary encoder 92 in rack and pinion mechanism, the position of the movable die plate 2 can be detected.

As the die for the foamed resin molding machine, an aluminum die is used instead of an iron die used for injection molding machine or die-casting machine. The reason is that steam is used, and it may cause corrosion, and the aluminum of high thermal conduction is used for shortening the cooling time after molding and before opening the die. However, as compare with the iron die, the aluminum die is more likely to be worn and spent, and it is required to adjust the die thickness at small intervals when tightening the die. Otherwise, steam may splash out from the demolding surface, or the dimensional precision of the molding may be inferior. For these reasons, it is required to adjust the die thickness S at small intervals by using the die thickness adjusting means 9.

The die tightening housing 8 and the movable die plate 2 are provided with toggle links 5 reversely, and these toggle links 5 are connected to a cross head 6. The toggle link 5 is composed of a link A linked to the movable die plate 2, a link B linked to the link A and a die tightening housing 8, and a link C linked to the link B and the cross head 6.

A ball nut 15 is fixed to the cross head 6, and a ball screw 7 is threaded into this ball nut 15. The ball screw 7 is threadably mounted by penetrating through the die tightening housing 8 in a rotatable state. At the end of opposite side of the cross head 6 of the ball screw 7, an electric motor 12 for rotating the ball screw is connected by way of a coupling 11.

The toggle link 5 is provided with ball screw rotation control means 20 for controlling constant the cracking gap by stopping the movable die 4 at the cracking position when tightening and opening the die. The ball screw rotation control means 20 is composed of an electric motor 12 for moving the cross head 6 back and forth to flex the toggle link 5, a rotary encoder 32 provided on the electric motor 12 for detecting the position of the cross head 6, and a controller 33 connected to the rotary encoder 32 for controlling the position of the cross head 6. The electric motor 12 can also detect the load torque as the die tightening force.

The ball screw rotation control means 20 is thus composed, and the load torque when tightening the die can be measured as the die tightening force, and on the basis of this result, the die tightening housing 8 can be moved back and forth and the position can be adjusted finely by the die thickness adjusting means 9. Also by the ball screw rotation control means 20, flexing of the toggle link 5 can be controlled, and the cracking position can be set correctly. By the position holding function of the ball screw 7, the cracking position can be held correctly.

Following is the explanation of the operating method of the foamed resin molding machine described above.

Figure 2:
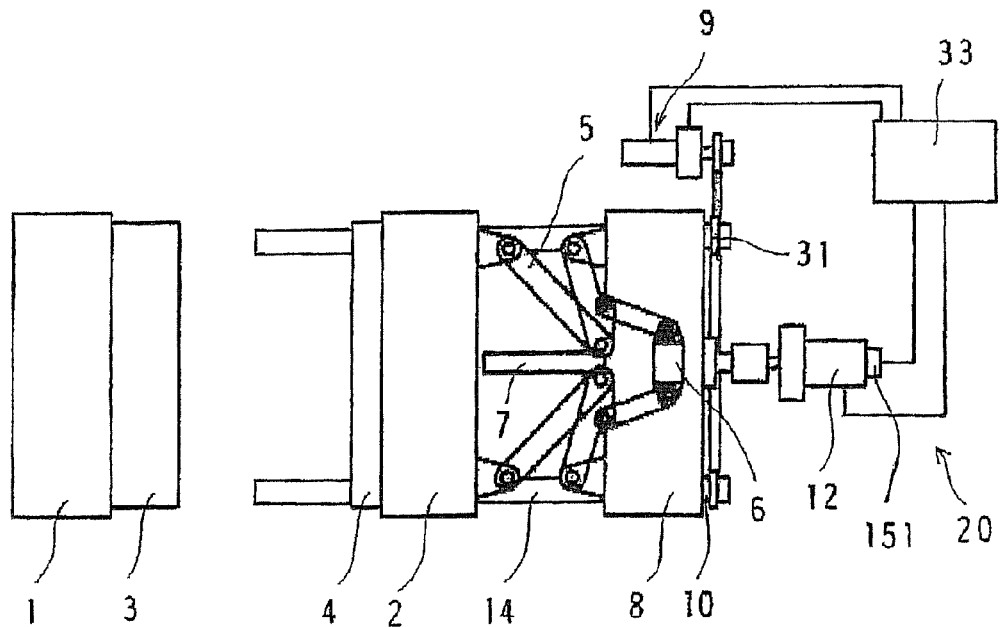
FIG. 2 is a schematic outline diagram of a foamed resin molding machine opened to a die opening limit.
Figure 4:
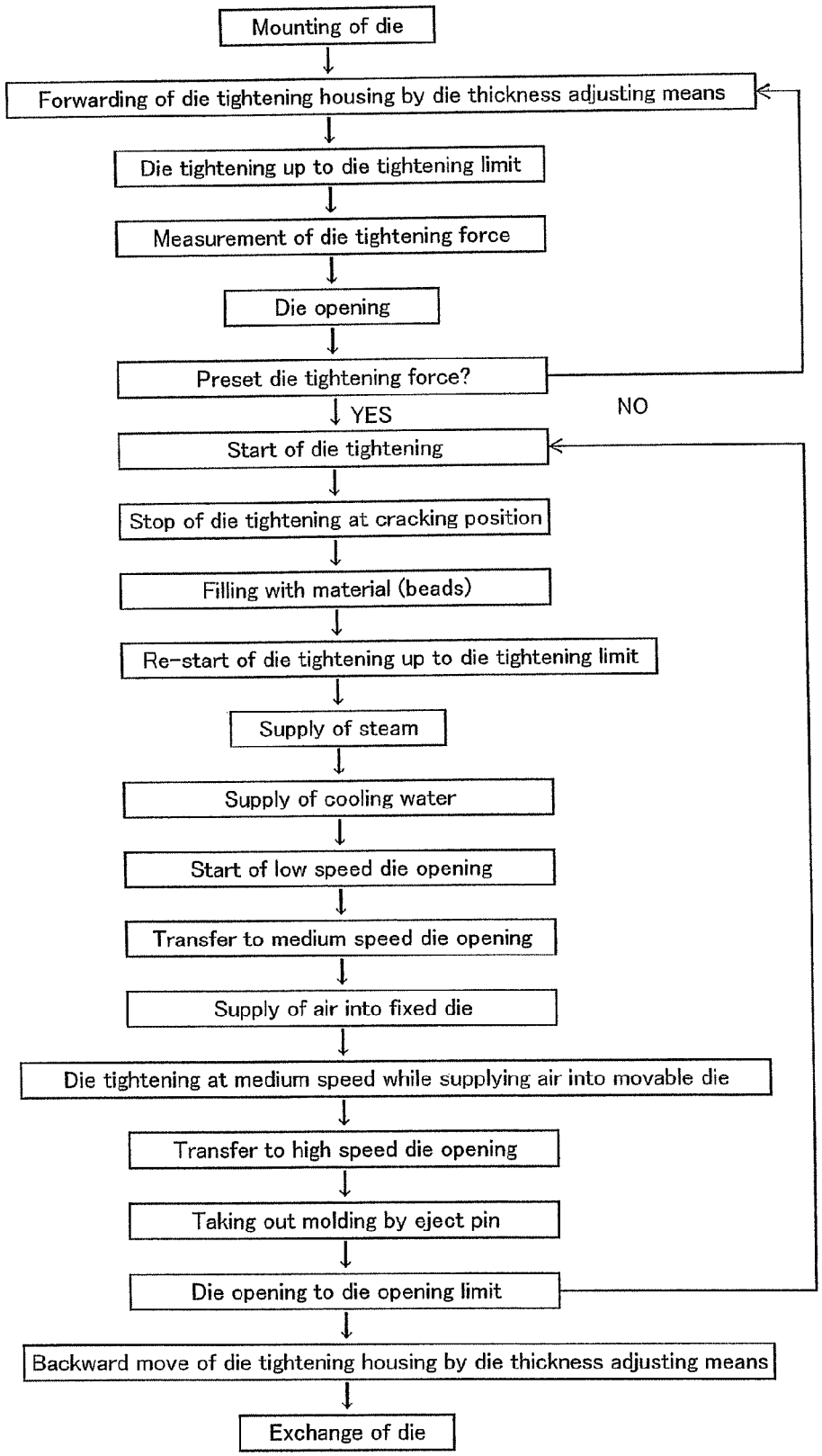
FIG. 4 is a process flow chart for manufacturing a foamed molding.
Figure 5:
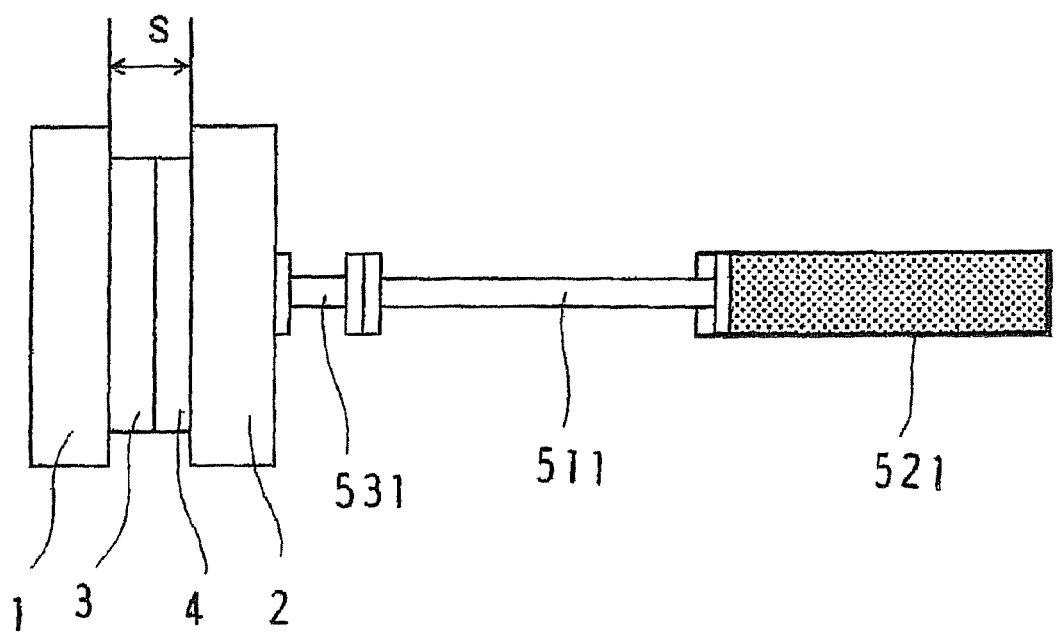
FIG. 5 is a schematic outline diagram of a foamed resin molding machine provided with a die opening and closing device in a prior art.

FIG. 4 is its process chart. FIG. 2 shows a state of maximum spacing of the movable die plate 2 from the fixed die plate 1 by flexing of the toggle link 5, and in this state, the die is exchanged and mounted corresponding to the molding to be manufactured.

After exchange of the die, the die tightening housing 8 is positioned preliminarily by driving of the die thickness adjustment motor 93 to conform to the exchanged die thickness S. The toggle link 5 is extended and the die is tightened to the die tightening limit, and the die tightening force is measured by the die tightening force measuring means. For example, the load torque of the electric motor 12 for tightening the die is measured as the die tightening force. Then the die is once opened, and the controller 33 judges if the die tightening force at this time conforms to the set value or not. If the die tightening force is too strong or too weak, the position of the die tightening housing 8 is adjusted finely, and the die tightening force is adjusted to the set value. The die tightening force can be also measured by detecting the elongation of tie bar 14 by the strain gauge attached to the tie bar 14, or by detecting the elongation of the tie bar 14 directly.

Figure 3:
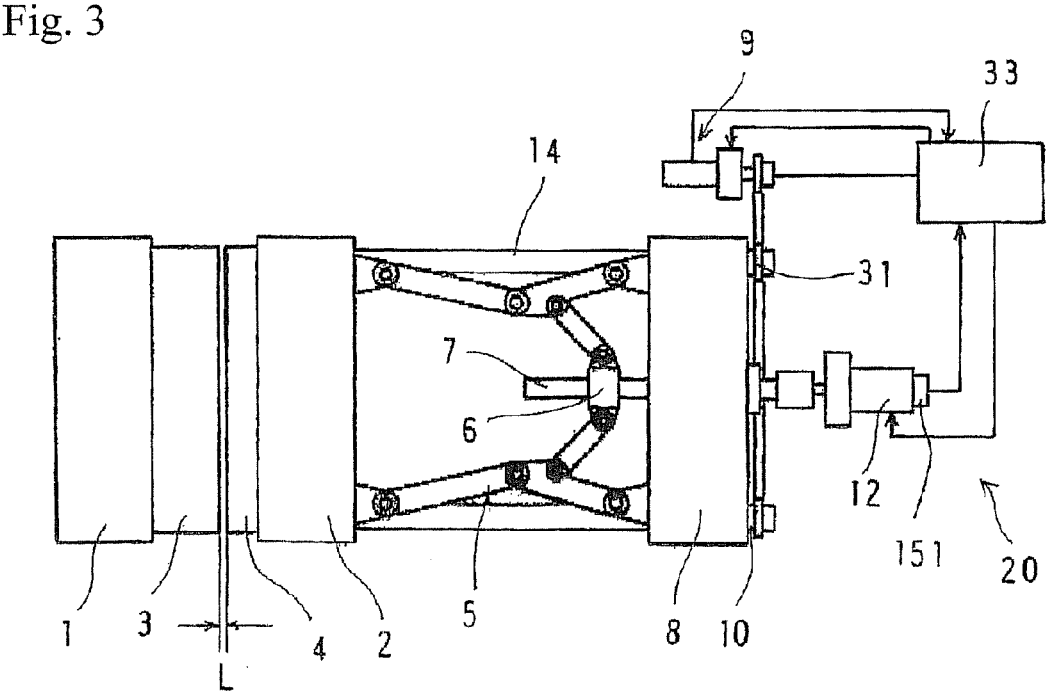
FIG. 3 is a schematic outline diagram of a foamed resin molding machine in which the movable die is stopped at cracking position when charging materials.

When the die tightening force conforms to the set value, the die tightening is started by extension of the toggle link 5, and the die tightening is stopped at a position leaving a cracking gap L (FIG. 3). Usually, the cracking position is about 0.1 to 10 mm before from the die tightening limit. In the invention, since the die is tightened by the toggle link 5, the moving speed of the movable die plate 2 is automatically reduced near the cracking position, and the movable die plate 2 can be moved at high speed on the whole. Since flexing of toggle link 5 is controlled by the ball screw rotation control means 20, the cracking position can be set correctly. Moreover, since the motor-driven ball screw 7 is used, the cracking position can be held correctly by the position holding function of the ball screw 7.

After stopping the movable die 4 at the cracking position, the material feed device 16 starts filling the cavity 13 with the material, and filling with the material is terminated by the timer counting provided in the material feed device 16.

Successively, after tightening the die again to the die tightening limit (FIG. 1), steam is supplied into the fixed die 3 and the movable die 4 through steam piping. When the timer for steam supply is counted, supply of steam is stopped. The material in the cavity 13 is expanded and fused. Later, cooling water is supplied into the fixed die 3 and the movable die 4 through water feed piping, and supply of water is stopped by timer counting for water feed. The expanded material is cooled, and caked, and molding is completed.

After molding, owing to the characteristic of the toggle link 5, the die is opened slowly, and the opening speed becomes medium at a position where the die is opened by 2 to 3 mm from the tightening limit, but the die is opened while air is supplied into the fixed die 3 from start of opening or slightly before opening, and the die opening is stopped at the cracking position of the demolding die opening for demolding, and the molding is lifted by air, and is transferred to the movable die 4 side. Next, while supplying air into the movable die 4, the die is tightened at medium speed up to the cracking position of the die tightening for demolding, and the die tightening is stopped, and the molding is transferred to the fixed die 3. Then, while opening the die at high speed, the molding is pushed out by the eject pin 17, and the molding is dropped down and taken out.

In the die opening operation, instead of presetting the cracking position, the pressure of the air supplied in the cavity 13 is detected, and opening is stopped when the pressure becoming lower than a specific pressure, and thus the operation can be stopped at a proper position suited to each mold by judging by the control device. Or by presetting the cracking position, the die opening position may be used as parameter, and the air pressure and the die opening and closing speed can be changed. The position, air pressure, and the opening and closing speed may be adjusted in the most preferable demolding conditions depending on the depth, shape, and demoldability of the molding, by means of the ball screw rotation control means 20, and the optimum condition can be repeated in every cycle of molding. Hence, the molding can be stably taken out, and demolding failure can be reduced substantially. As a result, the air consumption in demolding and discharging can be saved to half. Thus, molding of one cycle is completed. When molding a same molding successively, after opening the die to the die opening limit or to an intermediate point, the die is tightened to start material filling.

When exchanging the die, the die is opened to the die opening limit, and the die thickness adjustment motor 9 is driven, and the die tightening housing 8 is moved back to the die exchange position. By this operation, the die can be exchanged.

As explained herein, the foamed resin molding machine of the invention has the following features.

(1) The die is tightened by the electric motor 12 connected to the toggle link 5, and as compared with the conventional hydraulic cylinder system, the cracking position when filling with materials can be controlled at high precision. By the use of the toggle link 5, the moving speed of the movable die plate 2 is automatically reduced before the die tightening limit, and the stopping precision of the movable die plate 2 can be high. Therefore, the cracking position is always kept constant, and defective material filling can be prevented.

(2) After molding, the die opening is started by the electric motor 12 connected to the toggle link 5, and the cracking position can be controlled appropriately depending on the shape of the cavity 13, the depth, or the draft of the die. Therefore, demolding failure of molding due to excessive loss of air does not occur. Also by the use of the toggle link 5, the molding can be demolded at low speed from being demolded from the fixed die 2, and the die can be opened at high speed after demolding, so that the cycle time can be shortened.

(3) Since the toggle link system is employed in die opening and closing, the movable die plate 2 can be opened and closed by using four tie bars 14. When demolding, depending on the fitting degree of the molding and the die, or difference in frictional force at location of the contact surface of the fixed die 3 and movable die 4, the movable die plate and the fixed die plate may not be parallel to each other, but may be deviated in the die opening operation. Even in such a case, since the fitting portion of link A is close to each tie bar 14, deviation may be prevented, and the die can be opened smoothly. Therefore, deviation is smaller than in the conventional example of one hydraulic cylinder provided in the center of the movable die plate 2, and the molding can be demolded and taken out without causing deformation or other defect.

Second Embodiment

A second embodiment of the invention is described below.

Figure 6:
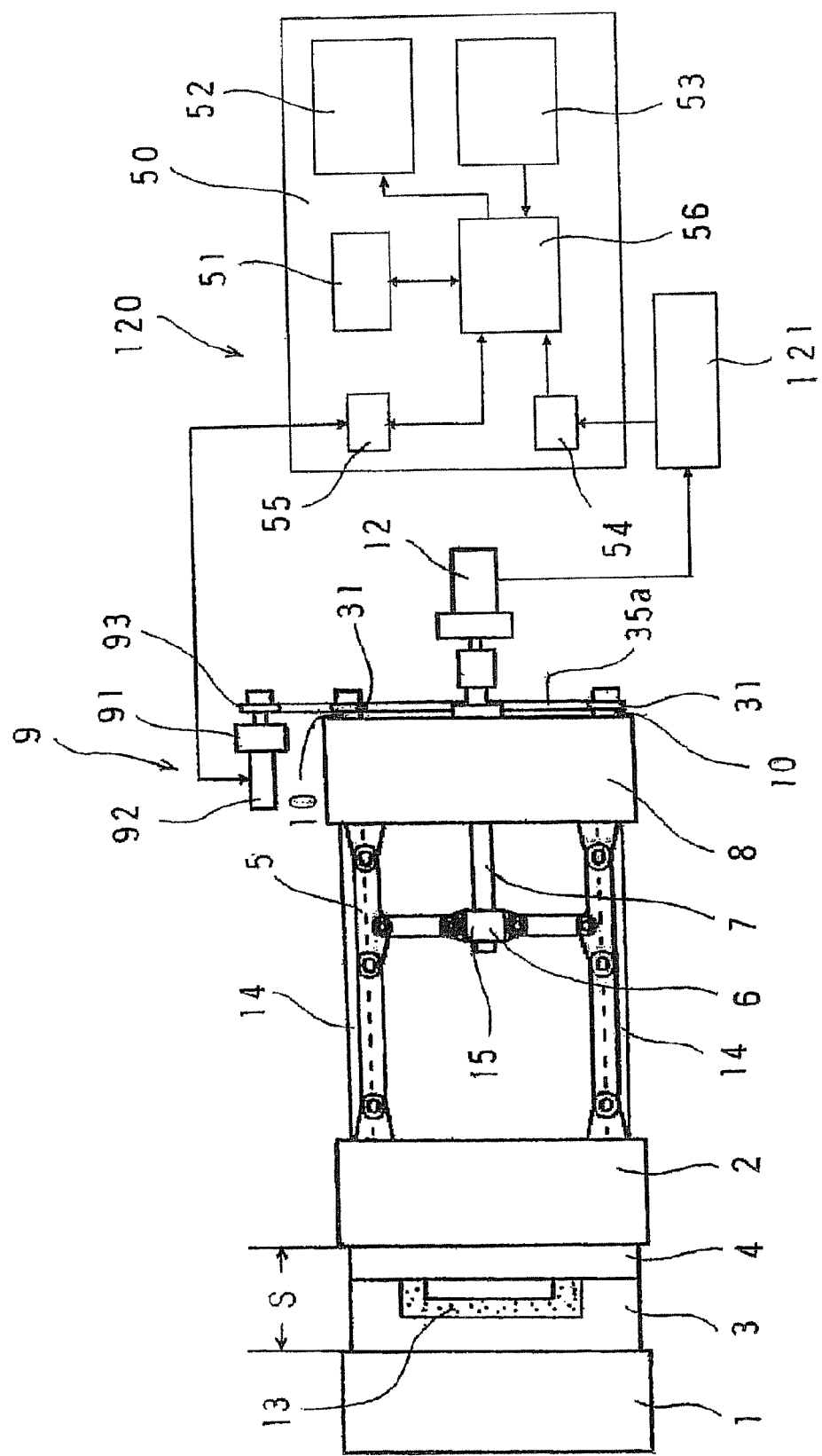
FIG. 6 is a schematic outline diagram of a foamed resin molding machine of the invention.

FIG. 6 is a schematic outline diagram of a foamed resin molding machine having a die tightening force adjusting mechanism. In FIG. 6, a movable die plate 2 is disposed reversely to a fixed die plate 1, and a die tightening housing 8 is disposed at the right side of the movable die plate 2 in the drawing.

The fixed die plate 1 is provided with a fixed die 3, and the movable die plate 2 is provided with a movable die 4. A cavity 13 is formed in the die consisting of the fixed die 3 and movable die 4. The fixed die 3 is provided with a material feeder, and an eject pin for extruding the molding, penetrating through the fixed die plate 1 (neither shown). The fixed die 3 and movable die 4 are individually provided with piping (not shown) for supplying water, steam, and air inside.

Four tie bars 14 are disposed, penetrating through the movable die plate 2 and the die tightening housing 8, and the die tightening housing 8 is positioned by adjusting nuts 10 fitted to the ends of the tie bars 14. Small gears 31 are provided coaxially on the adjusting nuts 10, and chains 35*a* are provided on the small gears 31 of the four tie bars 14.

Between the die tightening housing 8 and the movable die plate 2, toggle links 5 for composing a die opening and closing device are disposed, and the toggle links 5 are connected to a cross head 6. A ball nut 15 is fixed to the cross head 6, and a ball screw 7 is driven into this ball nut 15. The ball screw 7 is rotatable, and penetrates though and is engaged with the die tightening housing 8. At the opposite side end of the cross head of the ball screw 7, an electric motor 12 for rotation of ball screw is connected. That is, the die opening and closing device is composed of toggle links 5, and the ball screw 7 for flexing the toggle links 5 by way of the cross head 6.

The die opening and closing device is connected to a die tightening force adjusting mechanism 120. The die tightening force adjusting mechanism 120 is composed of a torque sensor 121 as torque detecting means for measuring the die tightening force, die thickness adjusting means 9 for adjusting the die thickness of the die tightened by moving the die tightening housing 8, and a controller 50 for commanding the measured deviation of the die tightening force to the die thickness adjusting means 9. Instead of the torque sensor 121, strain gauge attached to the tie bars 14 or other elongation detecting means may be used.

The die thickness adjusting means 9 includes a die thickness adjusting motor 91, and a rotary encoder 92 for detecting the position of the movable die plate 2, and the chain 35a is applied to a drive gear 93 mounted on the rotary shaft of the die thickness adjusting motor 91. The rotary encoder detects the rotating speed of the die thickness adjusting motor 91, and hence detects the position of the movable die plate 2. In this die thickness adjusting means 9, by operating the die thickness adjusting motor 91, the rotation of the drive gear is transmitted to the chain 35a, and each small gear 31 simultaneously rotates in batch. Each adjusting nut 10 moves back and forth along the thread portion of each tie bar 14, and the movable die plate 2 also moves back and forth, and the position in the longitudinal direction, that is, the die thickness S can be adjusted.

The controller 50 incorporates a CPU 56, and a memory 51 for storing the system program and the user program. The CPU 56 is connected to a monitor screen 52 for displaying the operation state of the molding machine main body, such as liquid crystal display, and a touch panel 53 including a keyboard. A torque sensor 21 is also connected to the CPU 56 by way of an interface 54, and the CPU 56 is connected to the die thickness adjusting means 9 by way of an interface 55.

The die tightening force adjusting mechanism 120 is thus composed, and the torque sensor 21 can measure the load torque when tightening the die as the die tightening force, and on the basis of the result, the controller 50 commands to adjust the position of the die tightening housing 8 finely by moving back and forth by the die thickness adjusting means 9, so that the die tightening force can be adjusted.

Figure 7:
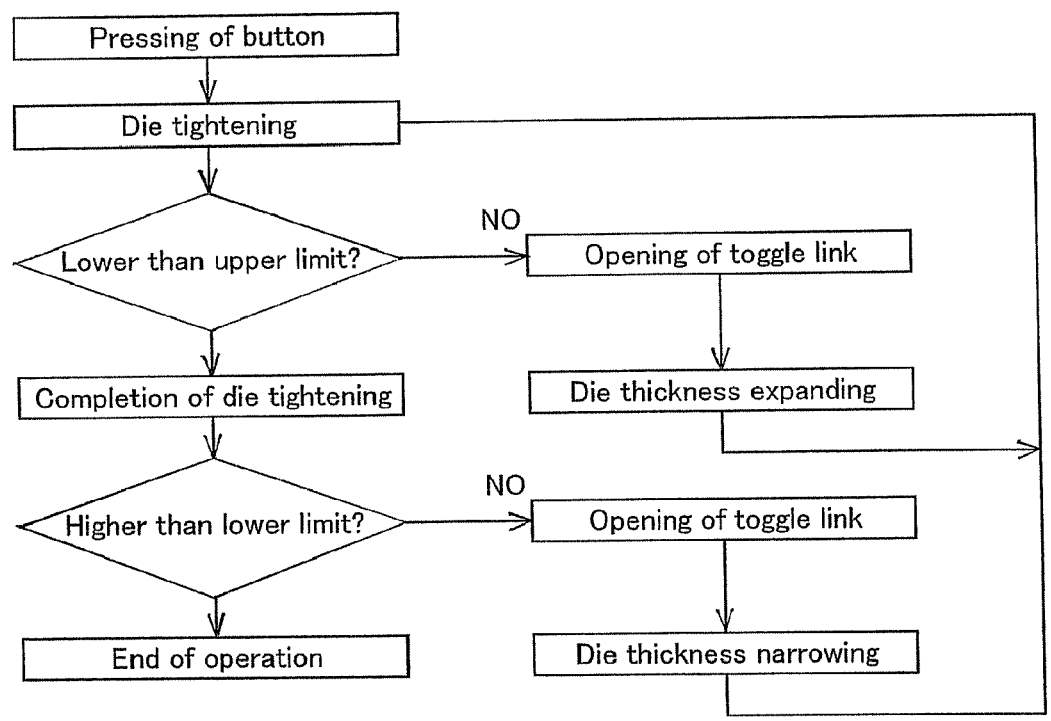
FIG. 7 is a flowchart of die tightening force adjusting process.

That is, as shown in FIG. 7, by pressing the button of the touch panel 53, the die is tightened, and the die tightening force is judged to be lower than the upper limit of the target or not. If more than the upper limit, the toggle links 5 are opened, and the die thickness adjusting means 9 moves the movable die plate 2 backward, and the die thickness is widened. The die is tightened again, and the die tightening force is measured, and if the value is lower than the upper limit, it is judged if higher than the lower limit. If lower than the lower limit, the toggle links 5 are opened, and the movable die plate 2 is moved forward by the die thickness adjusting means 9, and the die thickness is narrowed. By repeating such operation, when the die tightening force is somewhere between the upper and lower limits of the target, the adjustment operation of die tightening force is over. If exchanged to a die of a different thickness, the die tightening force can be adjusted by a similar operation.

The set value of die tightening force is preferably 30 to 70% of the die tightening force in actual molding process. In actual molding process, the die tightening force tends to be increased by expansion of die by steam, or pressurization by blowing air. If less than 30%, the die tightening force is insufficient in actual production, or if more than 70%, the die tightening force is excessive.

Figure 8:
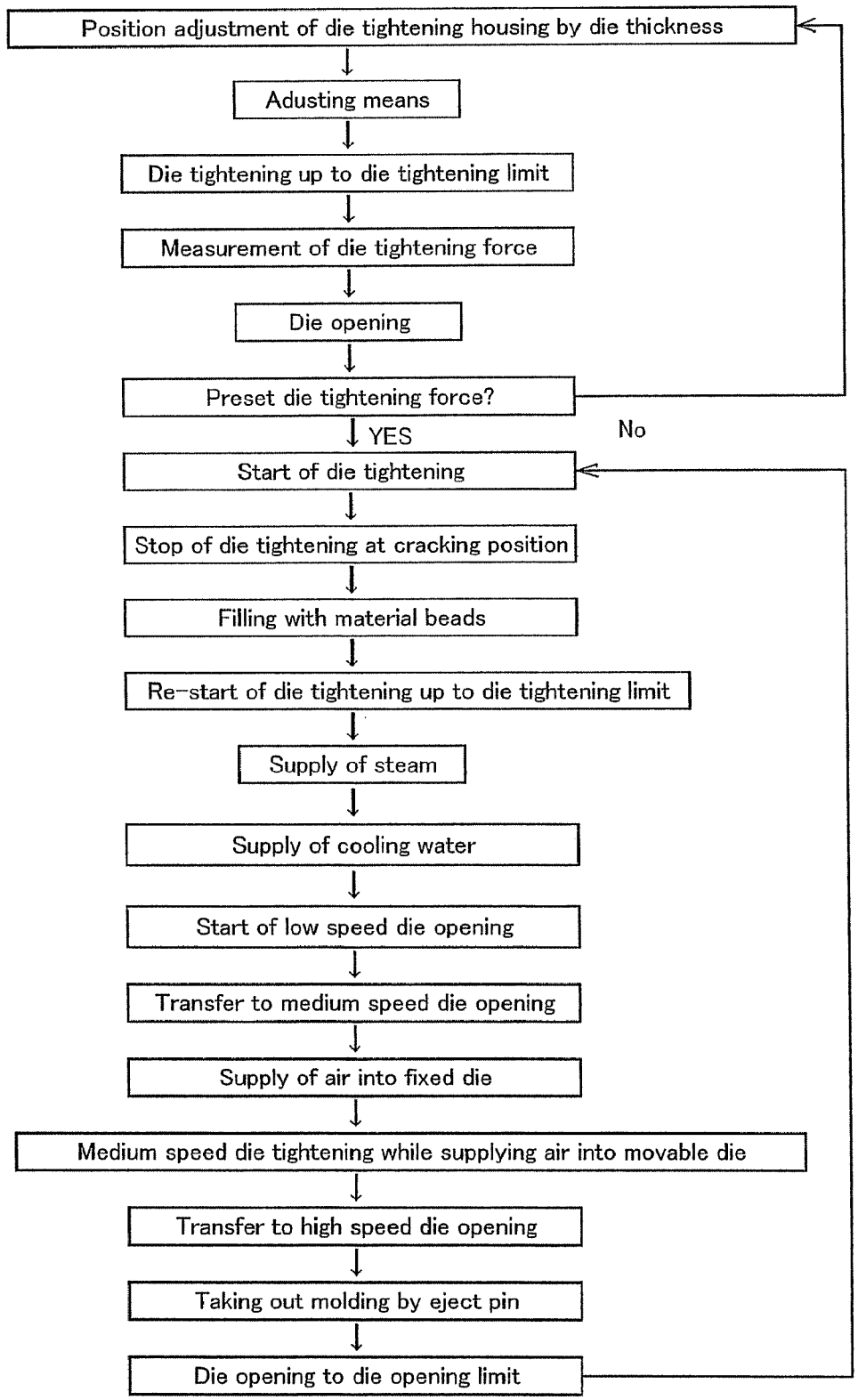
FIG. 8 is a process flow chart for manufacturing a foamed molding.

The operating method of the foamed resin molding machine is briefly explained below by referring to the process flowchart in FIG. 8.

First, the die tightening housing 8 is preliminarily positioned by driving of the die thickness adjusting motor 91 according to the die thickness S of the mounted die. The toggle links 5 are extended, and the die is tightened to the die tightening limit, and the load torque of the electric motor 12 is measured as the die tightening force. Once the die is opened, and at this time the controller 50 judges if the die tightening force is within the target range or not. If the die tightening force is insufficient or excessive, the die tightening housing 8 adjusts the position finely by moving back and forth, and the die tightening force is adjusted.

When the die tightening force is within the target range, the die tightening is started by extending the toggle links 5, and the die tightening is stopped at a position leaving a cracking gap S of about 0.1 to 10 mm. After stopping the movable die 4 at the cracking position, the material feed device starts to fill the cavity 13 with material beads, and the material filling is terminated when the timer of the material feed device counts up.

After tightening the die again to the die tightening limit, steam is supplied into the fixed die 3 and the movable die 4 through a steam piping. When the timer for steam supply counts up, supply of steam is stopped. The material in the cavity 13 is expanded and fused. Later, cooling water is supplied into the fixed die 3 and the movable die 4 through a water feed piping, and supply of water is stopped when the timer for water feed counts up. The expanded material is cooled, caked, and molding is completed.

After molding, the die is opened slowly, and the opening speed becomes medium at a position where the die is opened by 2 to 3 mm from the die tightening limit, but the die is opened while air is supplied into the fixed die 3 from simultaneous with a start of opening or slightly before opening, and the die opening is stopped at the cracking position of the demolding die opening, and the molding is lifted by air, and is transferred to the movable die 4 side. Next, while supplying air into the movable die 4, the die is tightened at medium speed up to the cracking position of the demolding die tightening, and the die tightening is stopped, and the molding is transferred to the fixed die 3. Then, while opening the die at high speed, the molding is pushed out by the eject pin, and the molding is dropped down and taken out.

In this manner, one cycle of molding is completed. When a same molding is manufactured successively, the die is opened to the die opening limit or to an intermediate point, and the die tightening can be started for filling with material.

As explained herein, the foamed resin molding machine of the present invention is capable of adjusting within an appropriate range by the die tightening force adjusting mechanism if the die tightening force varies due to advanced wear of the die, and hence prevents occurrence of defective products.

Third Embodiment

A third embodiment of the invention is described below.

Figure 9:
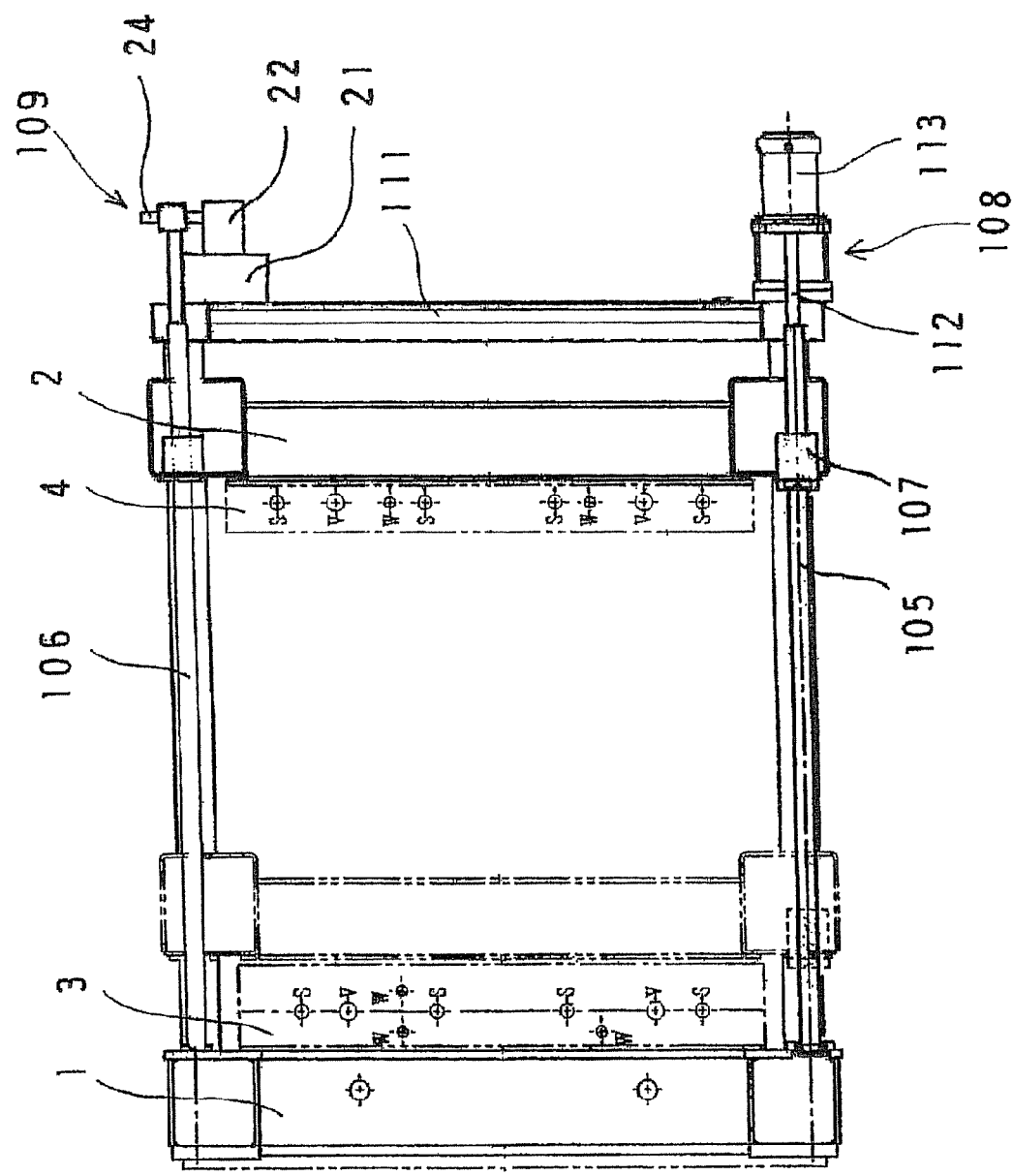
FIG. 9 is a plan view of a different embodiment of a foamed resin molding machine.
Figure 10:
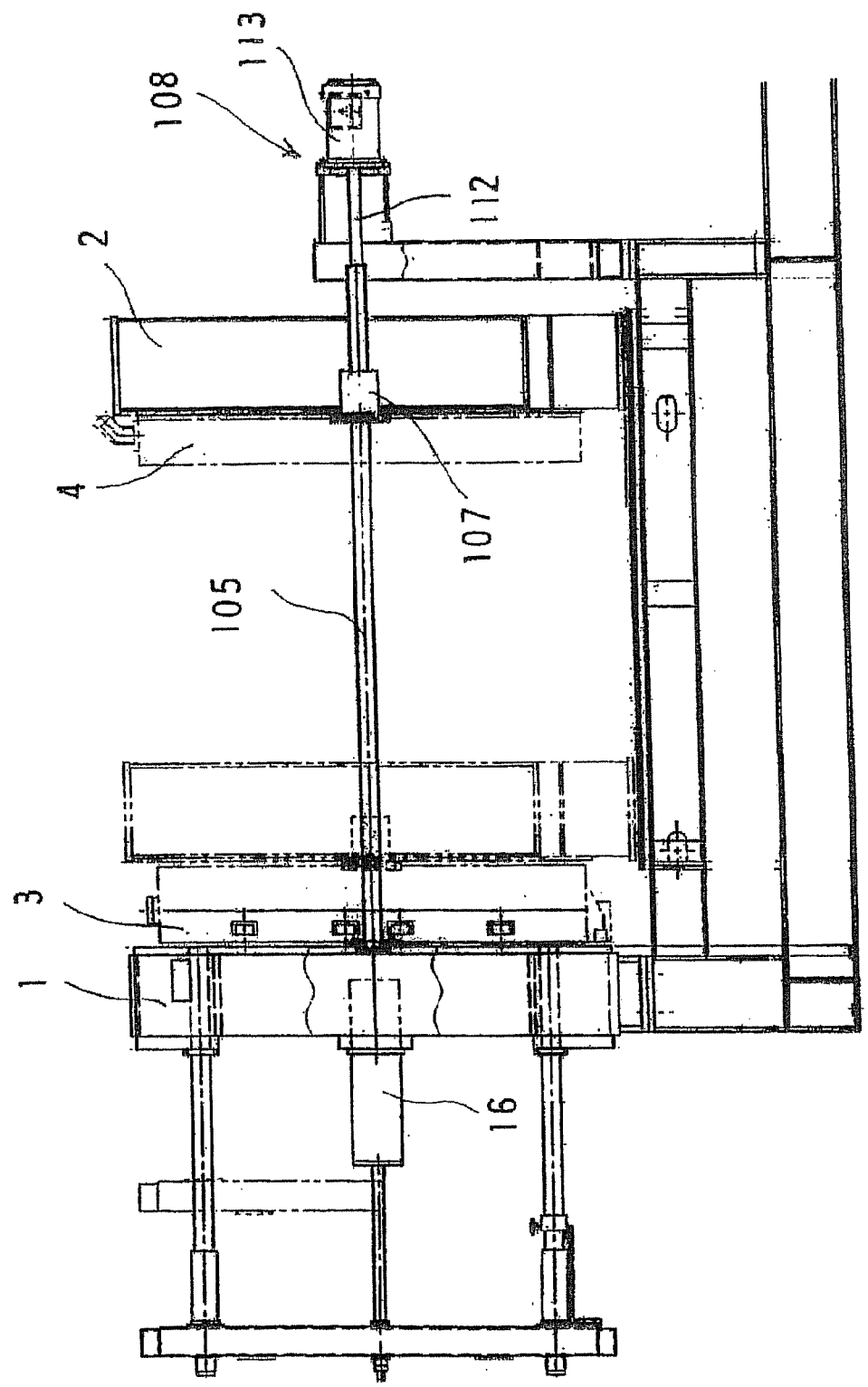
FIG. 10 is a front view of the foamed resin molding machine in FIG. 9.

FIG. 9 and FIG. 10 show a foamed resin molding machine of ball screw system for carrying out the present invention. In the diagrams, a movable die plate 2 is disposed reversely to a fixed die plate 1. These die plates 1, 2 are provided with a fixed die 3 and a movable die 4, respectively. The center of the fixed die 3 is provided with a material feed device 16 for sending out material beads by injection air. At an opposite position across the movable die 4, two ball screws 105, 106 are applied by way of a nut portion 107.

At the end of one ball screw 105, a high speed moving mechanism 108 of movable die plate 2 is disposed, and at one end of other ball screw 106, a low speed moving mechanism 109 of movable die plate 2 is disposed. Between these ball screws 105 and 106, a power transmission member 111 for transmitting the rotation of one ball screw 105 or 106 to other is interposed, such as belt or chain.

The high speed moving mechanism 108 is provided with a motor 113 having a motor shaft 112 directly coupled to the ball screw 105. The high speed moving mechanism 108 is used for moving the movable die 4 backward from the cracking position in demolding process, when moving the movable die 4 to the cracking position in material filling process, or when taking out the molding after demolding.

The low speed moving mechanism 109 is used when tightening the die after filling with material or when opening the die after molding, and is composed of a motor 21, a reduction gear 22 connected to the motor 21, and a gear 24 for transmitting the rotation of the reduction gear 22 to the ball screw 6. That is, the rotation of the motor 21 is reduced by the reduction gear 22, and is used to rotate the gear 24, so that the ball screw 106 can be rotated at low speed. The reduction gear 22 and the gear 24 are engaged or disengaged free by air. The motor 21 is increased or deceased in rotating speed as required.

In this molding machine, when moving the movable die plate 2 to the filling start cracking position, the motor 113 of the high speed moving mechanism 108 is driven, and the ball screws 105, 106 are rotated at high speed. As a result, the movable die 4 is moved at high speed to the direction of the fixed die 3, and is brought to the filling start cracking position.

Later, when closing the die by narrowing the cracking gap, the motor 113 is stopped, and the motor 21 of the low speed moving mechanism 9 is driven. As a result, the movable die 4 is brought closer to the fixed die 3 at low speed, and the cracking gap can be narrowed, and the die can be closed by a high tightening force.

Figure 11:
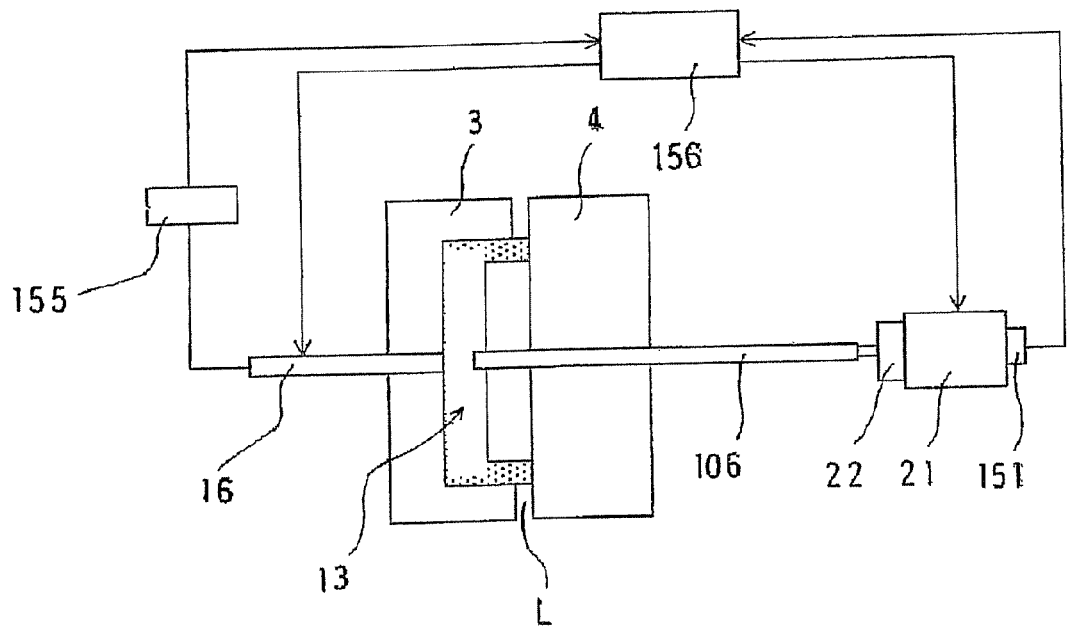
FIG. 11 is a schematic outline diagram of a foamed resin molding machine shown together with a control system.

FIG. 11 shows a control system in the foamed resin molding machine. In the diagram, a timer 155 is connected to the material filling device 16, and this timer 155 is connected to a controller 156. On the other hand, the motor 21 is provided with a position detector 151 of the movable die 4, such as rotary encoder. This position detector 151 is connected to the controller 156. Herein, L is a cracking gap.

Figure 12:
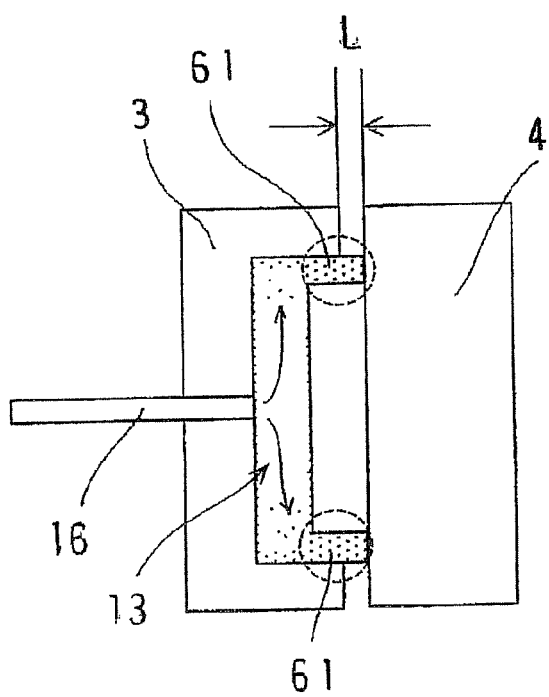
FIG. 12 is an explanatory diagram showing a state where die fitting portions are filled with material beads.
Figure 13:
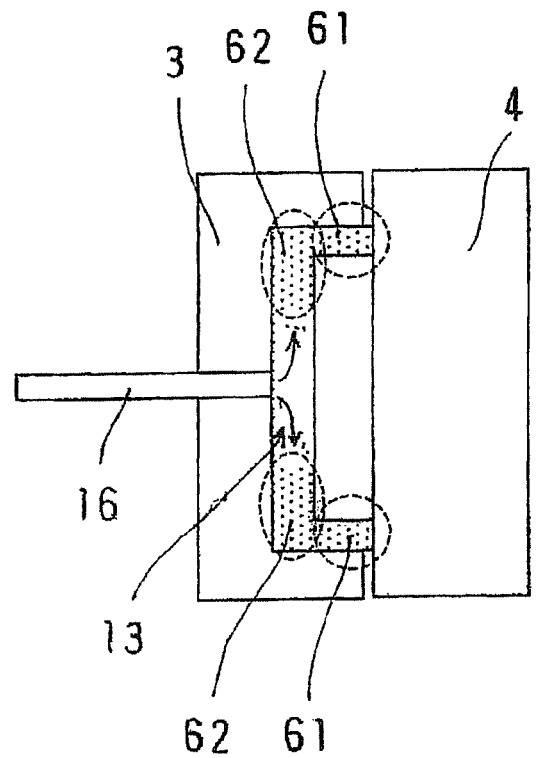
FIG. 13 is an explanatory diagram showing a state where middle portions are filled with material beads.
Figure 14:
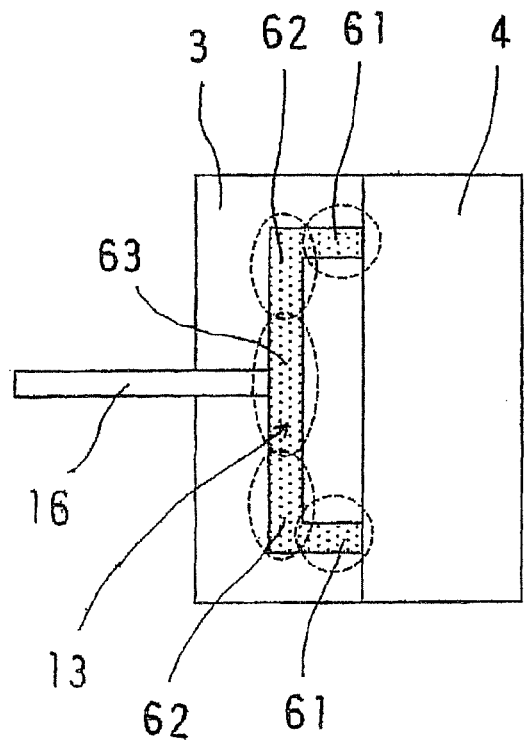
FIG. 14 is an explanatory diagram showing a state where of central portion is filled with material beads.
Figure 15:
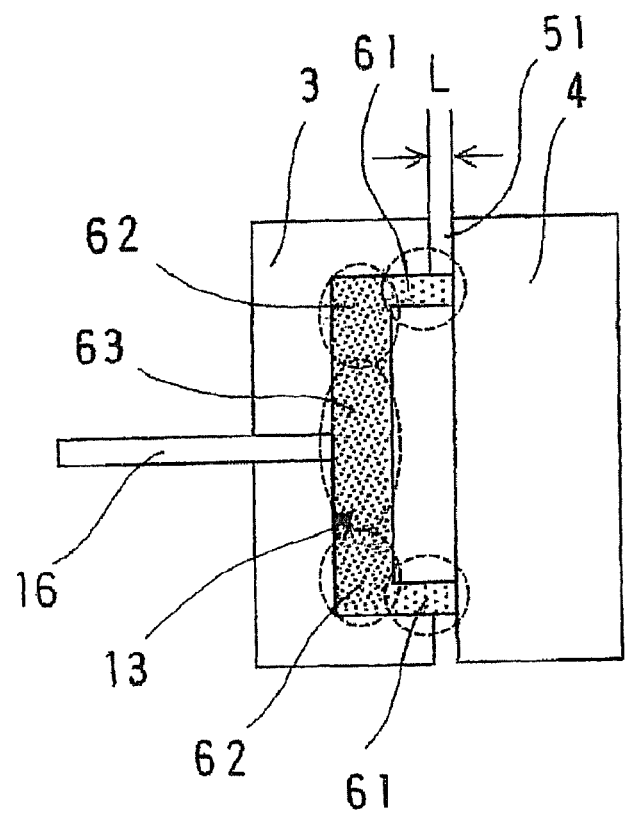
FIG. 15 is an explanatory diagram showing a state before closing of die in prior art, in which filling is insufficient in die fitting portions.
Figure 16:
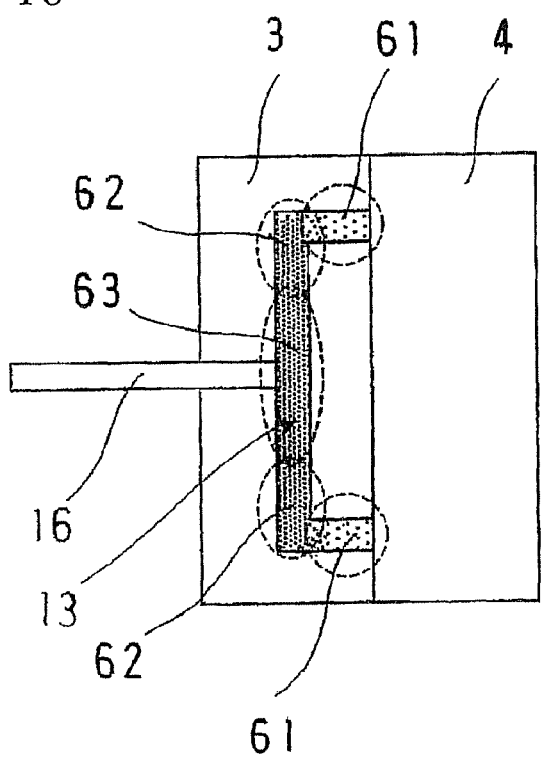
FIG. 16 is an explanatory diagram showing a state after closing of die in prior art, in which filling is excessive in the central portion.

The filling method of cracking gap L to narrow steplessly with material beads is explained on the basis of the FIG. 12 to FIG. 14.

When the movable die 4 is positioned to the filling start cracking position, the injection air is blown in, and the material beads are sucked, and sent them into the cavity 13. As a result, first, the die fitting portion 61 is filled with material beads (FIG. 12). Along with the filling process, the ball screw is rotated at low speed, and the cracking gap L is narrowed, and the central portion 62 and middle portion 63 are gradually filled with material beads (FIG. 13, FIG. 14). When the middle portion 63 is filled with a specified amount of material beads, the cracking gap L is closed completely, and the die closing is completed. Then, as required, the material beads are supplied, and especially in the vicinity of the middle portion 63 is filled sufficiently and the filling operation is over.

The above-described filling method is executed as follows. First, as shown in FIG. 11, the timer 155 starts counting upon start of supply of material beads. Along with progress of counting, the controller 156 drives the motor 21, and figures out accurately the position of the movable die 4 by the signal from the position detector 151. The rotating speed of the motor 21 can be adjusted appropriately.

Material beads are filled while narrowing the cracking gap L. As the timer 155 counts, judge the timing of moderate filling of the middle portion 63, the controller 156 commands to close the cracking gap L and finishing the die closing operation. After closing of the die, as required, further material beads are filled, and sending of material beads is stopped when the timer 155 counts up.

In the above-described process, in the midst of filling the cavity 13 with material beads while narrowing the cracking gap L steplessly, the ball screws 105, 106 are rotated reversely, and the cracking gap 51 can be expanded at least once. Expanding of cracking gap L is important that it should not exceed the cracking gap L at the time of start of filling for the purpose of preventing useless consumption of materials beads by diffusion. By repeating expansion and contraction of cracking gap L multiple times, if a bridge is formed by material beads, it can be destroyed by applying pulsations and vibrations by expansion and contraction of air. Therefore, later, by rotating the ball screws 105, 106 normally, the cracking gap L can be narrowed steplessly, and the cavity 13 can be uniformly filled with material beads. Further, by shifting the injection air to high and low pressure, filling with material beads will be more uniform.

Filling with material beads may be also executed by rotating the ball screws 105, 106 intermittently, and narrowing the cracking gap L at multiple steps. That is, at a first step, when the movable die 4 is put into the filling start cracking position, and material beads are supplied into the cavity 13, and the die fitting portion 61 is filled with material beads (FIG. 12).

At a second step, the movable die 4 is moved to narrow the cracking gap L one step further, and the central portion 62 is filled with material beads (FIG. 13). The material beads are also supplied in the midst of narrowing the cracking gap L.

At a third step, the movable die 4 is moved to narrow the cracking gap L one step further, and the middle portion 63 is filled with material beads moderately (FIG. 14).

At a fourth step, the cracking gap L is closed, and the die closing is completed. If filling of the middle portion 63 is not sufficient, material beads are further supplied, and a specified filling amount is assured.

This filling method consisting of the above-described four steps is executed as follows. That is, the timer 155 shown FIG. 11 starts counting when supply of material beads is started. As the counting progresses before filling of the die fitting portion 61 is completed, the controller 156 drives the motor 21, and the cracking gap L is further narrowed. When the counting is advanced until the central portion 62 is filled completely, the controller 156 drives the motor 21 again, and the cracking gap L is further narrowed one step more. At the timing of filling of the middle portion 63 with a specified amount of material beads, the die closing is terminated. After die closing, as required, further material beads are supplied to compensate for shortage, and when the timer 155 counts up, filling with material beads is finished.

EXAMPLE

By this material beads filling method consisting of four steps, a first case of filling start cracking gap of 5 mm and thickness of 20 mm was formed by foamed resin molding. As a result, overfilling of the central portion 62 and middle portion 63 can be prevented, and the cooling time after molding shortened by 20%.

In the invention, at least after the second step, once going back to the first step, the first step and the second step can be repeated plural times. Thus, by repeating expansion and contraction of the cracking gap L, the material beads in the cavity 13 may be pulsated or vibrated by expansion and contraction of air, and by destroying the bridge, the die fitting portion 61 and the central portion 62 may be uniformly filled with material beads.

Thus, the method of the invention is characterized by filling with material beads while closing the die continuously or intermittently. That is, simultaneously with completion of die closing, filling is completed, or shortage is compensated after completion of die closing, and unlike the prior art, the die is not closed after filling with material beads. Hence, it is not accompanied by overfilling due to die closing. Further, in the midst of filling, the cracking gap L is expanded or contracted, and the bridge is destroyed by air pulsation, and uniform filling with material beads is achieved.

Fourth Embodiment

The foamed resin molding machine for carrying out the method of the invention is same as shown in FIG. 9 and FIG. 10.

In this molding machine, a high speed moving mechanism 108 is provided with a motor 113 having a motor shaft 112 directly coupled to the ball screw 105. The high speed moving mechanism 108 is used for moving the movable die 4 backward from the cracking position in demolding process, when moving the movable die 4 to the cracking position in material filling process, or when taking out the molding after demolding.

The low speed moving mechanism 109 is used when tightening the die after filling with material or when opening the die after molding, and is composed of a motor 21, a reduction gear 22 connected to the motor 21, and a gear 24 for transmitting the rotation of the reduction gear 22 to the ball screw 6. That is, the rotation of the motor 21 is reduced by the reduction gear 22, and is used to rotate the gear 24, so that the ball screw 106 can be rotated at low speed. The reduction gear 22 and the gear 24 are engaged or disengaged free by air. The motor 21 is increased or deceased in rotating speed as required.

Figure 17:
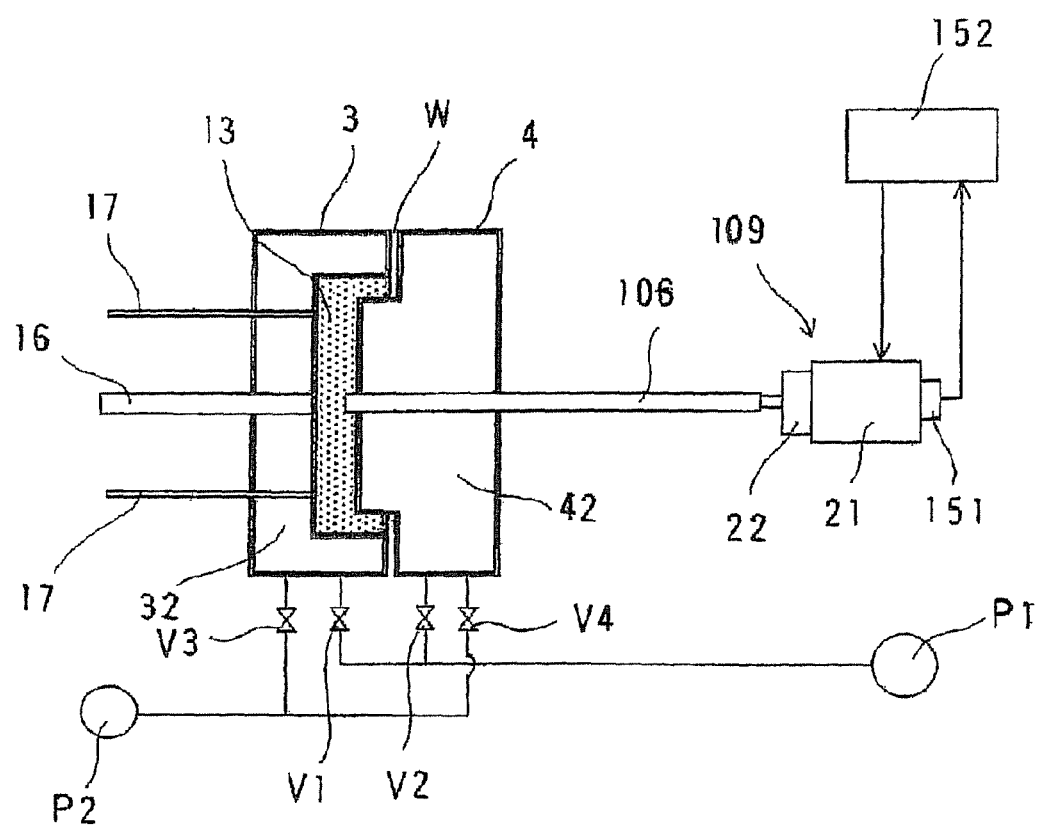
FIG. 17 is a schematic outline diagram of a foamed resin molding machine shown together with a control system and an air feed/intake system.

FIG. 17 is an outline diagram of a die opening mechanism, in which a motor 21 is provided with a position detector 151 of movable die 4 such as rotary encoder. A controller 152 connected to this position detector 151 drives the motor 21 based on the detected position of the movable die 4, and moves the movable die 4 gradually to the demolding cracking width W while slowing down the speed gradually by means of the ball screw mechanism. The inside of the fixed die 3 and the movable die 4 is formed as steam chambers 32, 42, and they communicate with the cavity 13 through vent holes of core vents not shown. In the diagram, P1 is a high pressure air source, and P2 is a vacuum pump, and V1 to V4 are valves provided in the piping. Reference numeral 17 is an eject pin.

<Demolding Method 1>

After manufacturing a molding, when opening the movable die 4 from the die tightening limit (the movable die fixed to the fixed die with a specified pressure) to the demolding cracking width W, the controller 152 commands to drive the motor 21 of the low speed moving mechanism 109 in reverse direction of die tightening. As a result, the ball screws 106, 105 are rotated reversely at low speed, and the movable die 4 is demolded from the fixed die 3, and the movable die 4 can be positioned at a preset cracking width W.

In this die opening operation, the cracking width W must be set at 3 to 30% of the molding height. If the cracking width W is less than 3%, the molding cannot be demolded sufficiently from the die, or if exceeding 30%, the cracking width W is too wide, and the compressed air escapes from the gap, and the molding cannot be demolded effectively. Hence, the cracking width W must be set at 3 to 30%. Setting of such narrow cracking width W is not achieved by the die opening mechanism of the hydraulic cylinder system, and it can be achieved only by the ball screw mechanism capable of holding the position at high precision without allowing fluctuations.

The die can be opened by moving the movable die 4 at specified pitch, and setting gradually to the cracking width W. The pitch can be set at 1 mm to 10 mm corresponding to the height of the molding. The die can be opened initially at high speed and gradually at lower speed until the cracking width W. The cracking width W is 150 mm at maximum corresponding to the height of the molding.

In the die opening operation, the valve V2 is opened, and compressed air is supplied into the steam chamber 42 of the movable die 4, and at this time the compressed air can be supplied before the start of die opening or after the start of die opening. When compressed air is supplied into the steam chamber 42 before the start of die opening, a high pressure can be loaded and held on the front face of the molding. When compressed air is supplied into the steam chamber 42 right after the start of die opening, the compressed air is introduced from a narrow opening of the die, and a high pressure can be loaded on the front face of the molding. Anyway, leak of compressed air from the cracking gap can be minimized, and an effective demolding is achieved. During die opening operation, the compressed air can be supplied into the steam chamber 42 at every move of the movable die 4 at specified pitch. Or, regardless of the moving mode of the movable die 4, the compressed air can be supplied continuously.

When opening the die, by opening the valve V3, when the steam chamber 32 in the fixed die 3 is set to negative pressure, the molding is sucked into the fixed die 3, and it is demolded more easily. Thus, the molding is lifted from the movable die 4, and transferred to the fixed die 3.

After the molding is transferred to the fixed die 3, the molding is demolded from the fixed die 3. That is, the valve V1 is opened, and the compressed air is supplied into the steam chamber 32, and a high pressure is loaded to the back of the molding. Further, the valve V4 is opened, and a negative pressure is applied to the steam chamber 42, and the molding is sucked to the movable die 4 side through the vent hole of the core vent, and the molding can be demolded from the fixed die 3. Later, the movable die 4 is moved back at high speed, and the molding is pushed out by the eject pin 16, so that the molding can be taken out.

EXAMPLE

The cavity is filled with material beads, and a molding of height of 100 mm was manufactured. It was cooled and solidified, and prior to demolding, compressed air was supplied to fill the steam chamber 42 of the movable die 4. At pitches of 5 mm, the movable die was moved twice, and the cracking width W of 10 mm was formed. The molding was demolded by supplying and filling with compressed air every move of the movable die in the steam chamber 42 so that a specified pressure may be maintained. At this time, a negative pressure was applied to the steam chamber 32 of the fixed die 3 by the pump P1 so that the molding may be sucked to the fixed die 3.

After the molding was demolded from the movable die 4, compressed air was supplied into the steam chamber 32 of the fixed die 3, and a negative pressure was applied to the steam chamber 42 of the movable die 4 and the molding was demolded from the fixed die 3, and further the movable die 4 was opened widely, and the molding was dropped and taken out. Thus, the demolding cracking width W was conventionally required to be more than 30 mm, but was substantially reduced to 10 mm, and the molding could be demolded effectively.

<Parting method 2>

Same as in method 1, after manufacturing a molding, the ball screws 106, 105 are rotated reversely, and a cracking width W of 3 to 30% of the molding height is formed between the fixed die 3 and the movable die 4. When opening the die, the movable die 4 is moved at specified pitch, and further moved to the cracking width W gradually at specified pitch. The die can be opened by starting from the initial high speed and slowing down gradually to the cracking width W.

At this time, the valve V1 is opened, and compressed air is supplied into the steam chamber 32 of the fixed die 3, but the compressed air may be supplied before opening the die or after opening the die. Anyway, since a high pressure can be applied to the molding while the cracking gap is narrow, and the molding can be demolded effectively. The compressed air may be supplied at every pitch move of the movable die 4, or continuously. Simultaneously when opening the valve V1, the valve V4 may be opened, and a negative pressure is applied to the steam chamber 42 of the movable die 4, so that the molding may be effectively lifted from the fixed die 3 and transferred to the movable die 4.

After the molding is transferred to the movable die 4, a second step begins. The ball screw is rotated normally, and the die is tightened to the die tightening limit or to an intermediate point.

A third step begins. After tightening the die, the ball screws 106, 105 are rotated reversely, and a cracking width W of 3 to 30% of the molding height is formed between the fixed die 3 and the movable die 4. The die can be opened by moving the movable die 4 at specified pitch, gradually to the cracking width W. Or starting from high speed, the speed may be gradually lowered to the cracking width W. At this time, the valve V2 is opened, and compressed air is supplied into the steam chamber 42 of the movable die 4, but the compressed air may be supplied before opening the die or right after opening the die. The compressed air may be supplied at every pitch move of the movable die 4, or continuously. Simultaneously when opening the valve V2, the valve V3 may be opened, and a negative pressure is applied to the steam chamber 32 of the fixed die 3, so that the molding may be effectively lifted from the movable die 4 and transferred to the fixed die 3.

After the above-described first to third steps, the die is opened widely by the high speed moving mechanism 8, and the molding is pushed out by the eject pin 17, and taken out.

The third step may be also followed by a fourth step, in which the ball screws 106, 105 are rotated normally again, and the die is tightened to the die tightening limit or to an intermediate point. After the fourth step, going back to the first step, the same operation may be repeated plural times, and by pulsation of air due to die opening and die tightening, a high pressure can be applied repeatedly on the backside and foreside of the molding, and the molding can be demolded without causing deformation or damage in the narrow demolding cracking width. After the molding is demolded completely from the die, the die is opened widely, and the molding is pushed out by the eject pin 16, and taken out.

As explained herein, according to the invention, the demolding cracking width can be set narrowly and at high precision, and a high pressure can be applied to the molding interface efficiently. Hence, by a small volume of compressed air, the molding can be favorably taken out without causing defects.

Fifth Embodiment

The foamed resin molding machine mentioned above is specifically described below.

Figure 18:
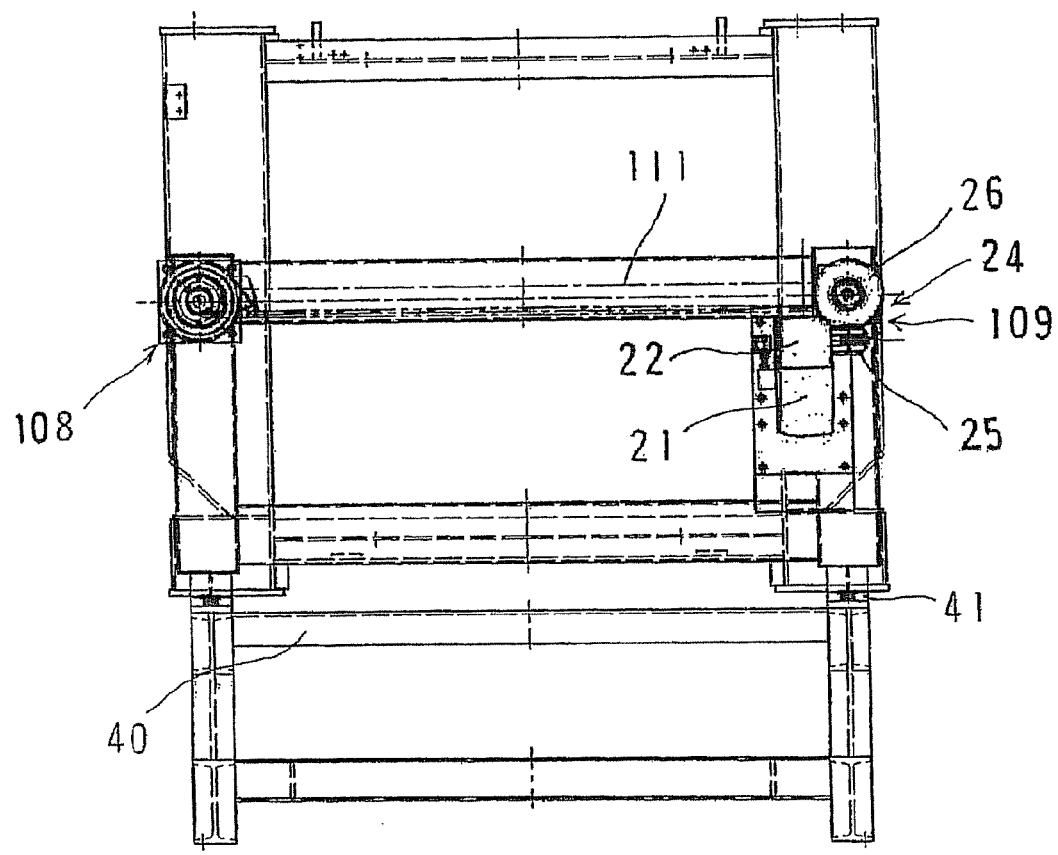
FIG. 18 is a side view of the foamed resin molding machine in FIG. 9.

FIGS. 9, 10 and 18 are diagrams showing the foamed resin molding machine of the invention. In the drawing, a high speed moving mechanism 8 is provided with a motor 113 having a motor shaft 12 directly coupled to a ball screw 105. The ball screw 105 is rotatably supported by a bearing not shown. Rotation of the motor shaft 112 is directly transmitted to the ball screw 105, and by rotating the motor shaft 112 at high speed, the ball screw 105 is rotated at high speed. At this time, a ball screw is also rotated at same speed as the ball screw 105 by way of a power transmission member 111. Hence, the movable die plate 2 can be moved at high speed in the die closing direction by the two ball screws 105, 106.

Figure 19:
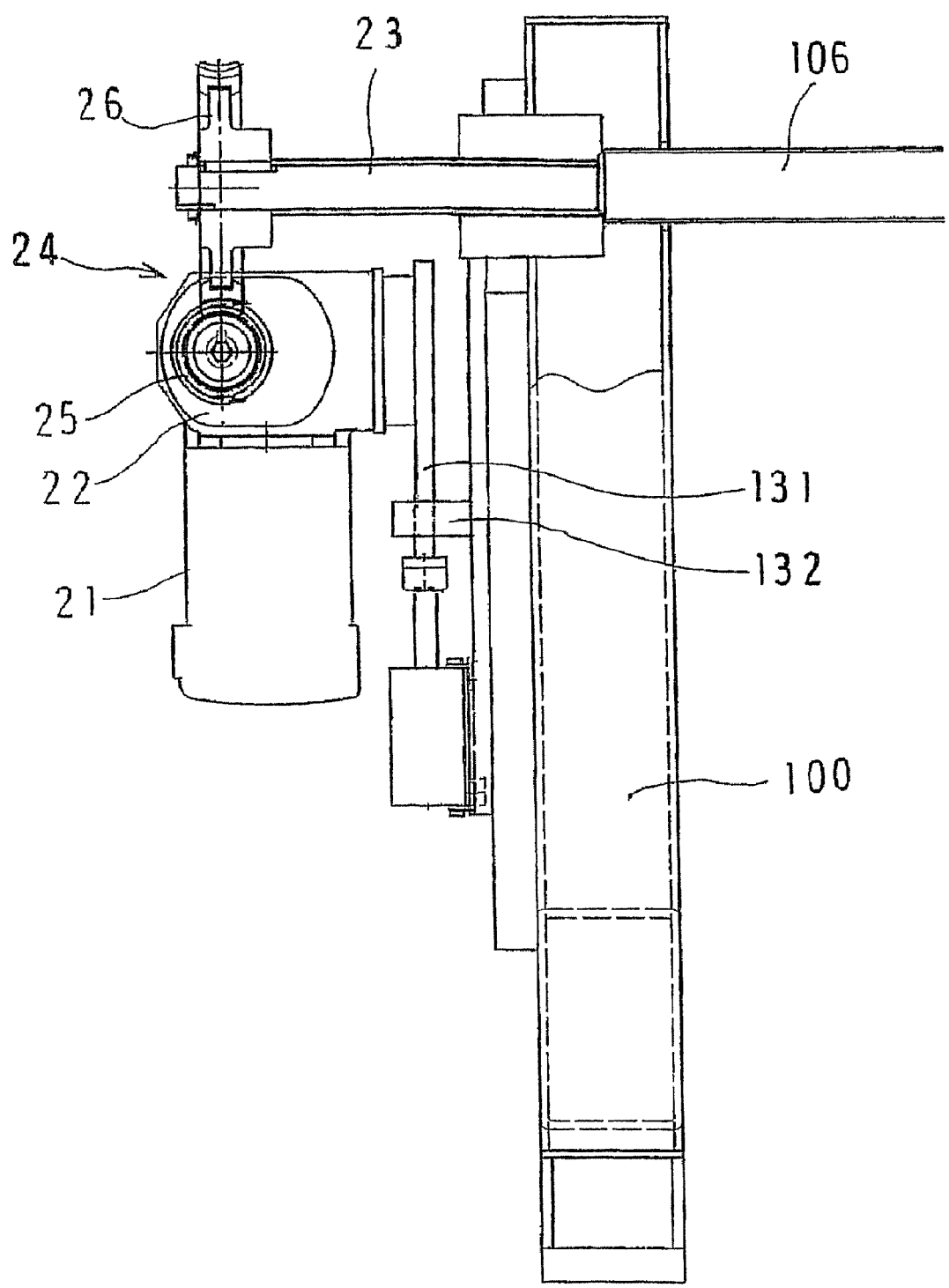
FIG. 19 is a front view of low speed moving mechanism.

A magnified view of a low speed moving mechanism 109 is shown in FIG. 19. The low speed moving mechanism 109 is composed of a motor 21, a reduction gear 22 connected to the motor 21, and a worm gear 24 for transmitting the rotation of the reduction gear 22 to a base end shaft 23 of the ball screw 106. The worm gear 24 includes a worm 25 at the reduction gear 22 side, and a worm wheel 26 at the base end shaft 23 side. That is, the rotation of the motor 21 is reduced by the reduction gear 22, and is used to rotate the worm 25. The worm 25 rotates the worm wheel 26 engaged therewith, so that the ball screw 106 can be rotated at low speed.

Figure 23:
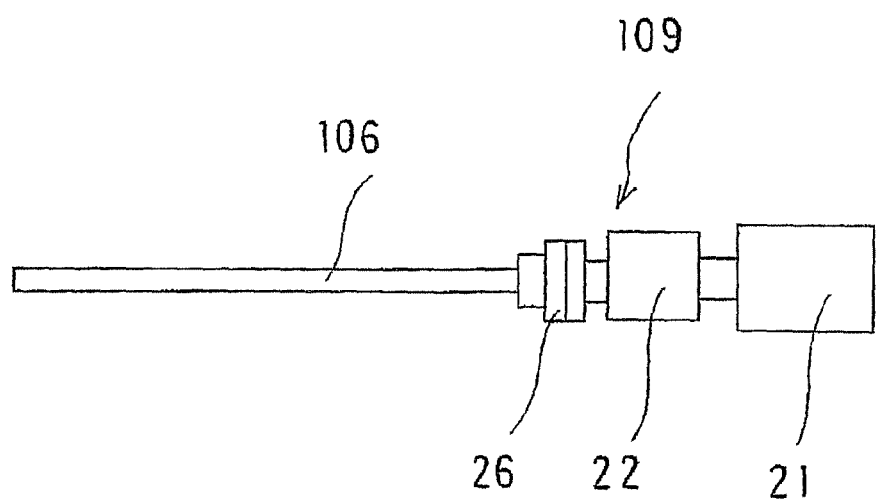
FIG. 23 is an explanatory diagram of low speed moving mechanism provided with clutch mechanism.

The reduction gear 22 is supported on a guide unit 132 elevatably by an air cylinder 131. That is, the air cylinder is slidably inserted into the guide unit 132. Therefore, when the low speed moving mechanism 109 is not used, the worm 25 is lowered, and is disengaged from the worm wheel 26, and damage of the motor 21 can be avoided. Or, as shown in FIG. 23, the worm gear 24 may be replaced by a clutch mechanism 26, so that rotation of the ball screw 6 may not be transmitted to the reduction gear 22 or motor 21.

Figure 22:
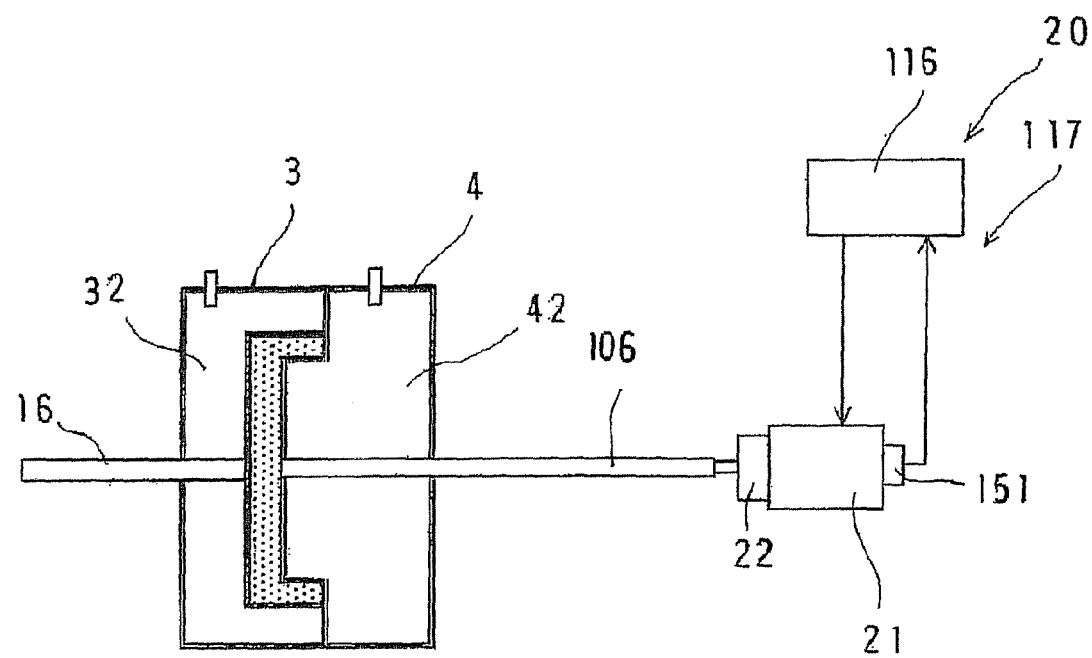
FIG. 22 is an explanatory diagram of ball screw rotation control means.

The low speed moving mechanism 8 is, as shown in FIG. 22, connected to ball screw rotation control means 20 composed of a position detector 151 of movable die 4 such as rotary encoder, and a controller 116 for sending drive or stop command to the motor 21. By this ball screw rotation control means 20, the movable die 4 can be stopped correctly at specified cracking position when tightening or opening the die. The motor 21 can detect the die tightening force by the load torque.

Since the high speed moving mechanism 108 and the low speed moving mechanism 109 are formed separately and the structure is simplified, one plate can be omitted, such as the fixing plate or die plate in the prior art. Hence, the entire structure is simple, having only two die plates, a fixed die plate 1 and a movable die plate 2.

Figure 20:
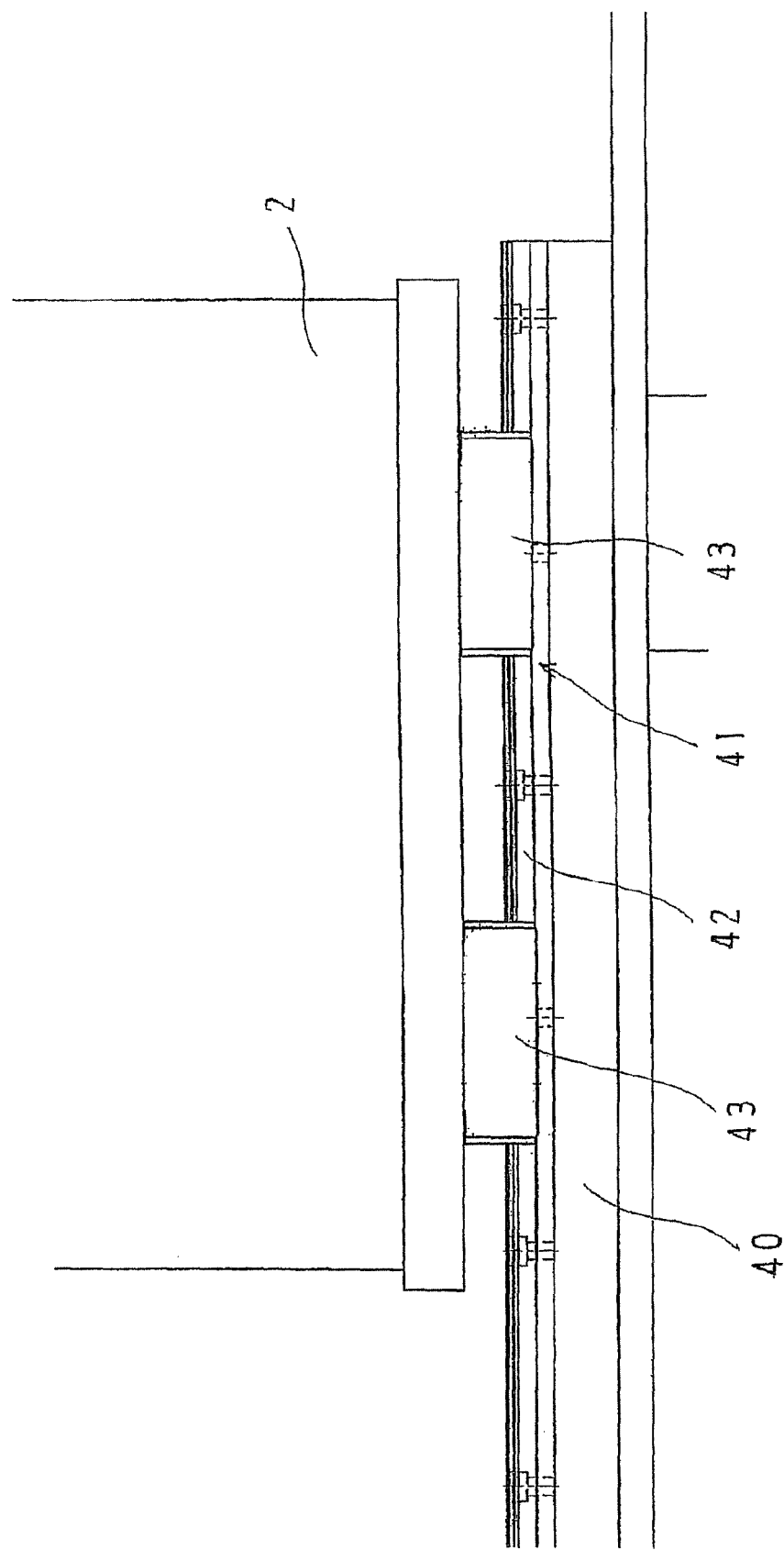
FIG. 20 is a magnified front view of a lower part of a movable die plate.
Figure 21:
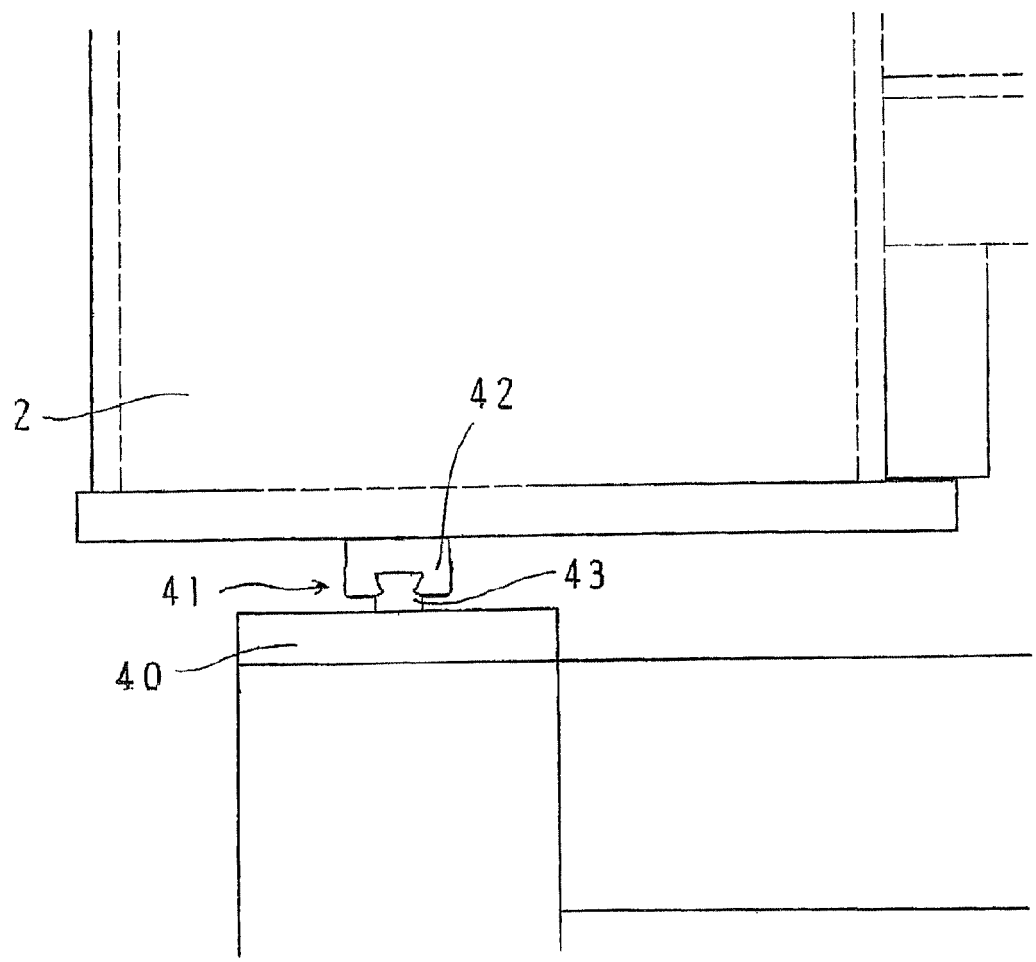
FIG. 21 is a magnified side view of a lower part of a movable die plate.

In the lower part of the movable die plate 2, a straight guide 41 is disposed as shown in FIGS. 20 and 21, and the movable die plate 2 can be moved easily. The straight guide 41 is composed of a rail 42 laid on a table 40, and a guide member 43 disposed at a specific interval at the backside of the movable die plate 2. A neck is formed at the side of the rail 42, and the guide member 43 is formed in a concave shape corresponding to the neck, and therefore the movable die plate 2 moves smoothly side to side on the rail 42 without running out.

In the above-described configuration, when the movable die plate 2 is closed, the air cylinder 131 is moved back, and the worm 25 and the worm wheel 26 are disengaged. The motor 113 is driven, and the ball screws 105, 106 are rotated at high speed. When the ball screws 105, 106 are put in rotation, the nut portion 107 engaged with the ball screws 105, 106 is moved toward the fixed die plate 1, so that the movable die 4 can be moved at high speed into the direction of the fixed die 3.

When the movable die 4 comes closer to the fixed die 3, the motor 113 slows down, and the movable die plate 2 is moved at low speed. When the movable die 4 comes to the closing position, the air cylinder 131 is projected upward, and the worm 25 and the worm wheel 26 are engaged with each other, and the motor 21 is driven, and the movable die 4 is tightened to the fixed die 3 at low speed and high tightening force by way of the reduction gear 22. Since the motor is controlled by the inverter, the foamed resin molding machine can be operated efficiently at low energy.

After the movable die 4 is stopped at specified cracking position, the cavity 13 is filled with material, and steam is injected into the steam chambers 32, 42 of the fixed die 3 and movable die 4, and the material is foamed and molded. In this molding process, when the movable die 4 is tightened to the die tightening limit, the die tightening force is increased by the steam pressure and the expansion of the fixed die 3 and movable die 4. If this state continues, the ball screws 105, 106 may be broken by tensile force. To prevent this, if the die tightening force increases, the motor is automatically rotated slightly in a direction of loosening the die tightening force by the torque control of the motor 22. Hence, the ball screws 105, 106 are rotated slightly, and the generated stress is lessened, and the die tightening force can be adjusted.

Sixth Embodiment

A sixth embodiment is described below while referring to the drawing.

The molding machine main body used in the foamed resin molding machine of the invention is shown in FIG. 9 and FIG. 10. That is, a high speed moving mechanism 108 of the movable die plate 2 is provided with a motor 113 having a motor shaft 112 directly coupled to a motor-driven ball screw 105. Rotation of the motor shaft 112 is directly transmitted to the motor-driven ball screw 105, and by rotating the motor shaft 112 at high speed, the motor-driven ball screw 105 is rotated at high speed. At this time, a motor-driven ball screw 106 is also rotated at same speed as the motor-driven ball screw 105 by way of a power transmission member 11. Hence, the movable die plate 2 can be moved at high speed in the die closing direction by the two motor-driven ball screws 105, 106.

The low speed moving mechanism 109 is composed of a motor 21, a reduction gear 22 connected to the motor 21, and a gear 24 for transmitting the rotation of the reduction gear 22 to one end of the motor-driven ball screw 106. The rotation of the motor 21 is reduced by the reduction gear 22, and the motor-driven ball screws 105, 106 are rotated at low speed. The gear 24 may be engaged with or disengaged freely from the reduction gear 22, and the rotation of the motor-driven ball screw 106 in high speed rotation may not be transmitted to the reduction gear 22 or motor 21.

Figure 24:
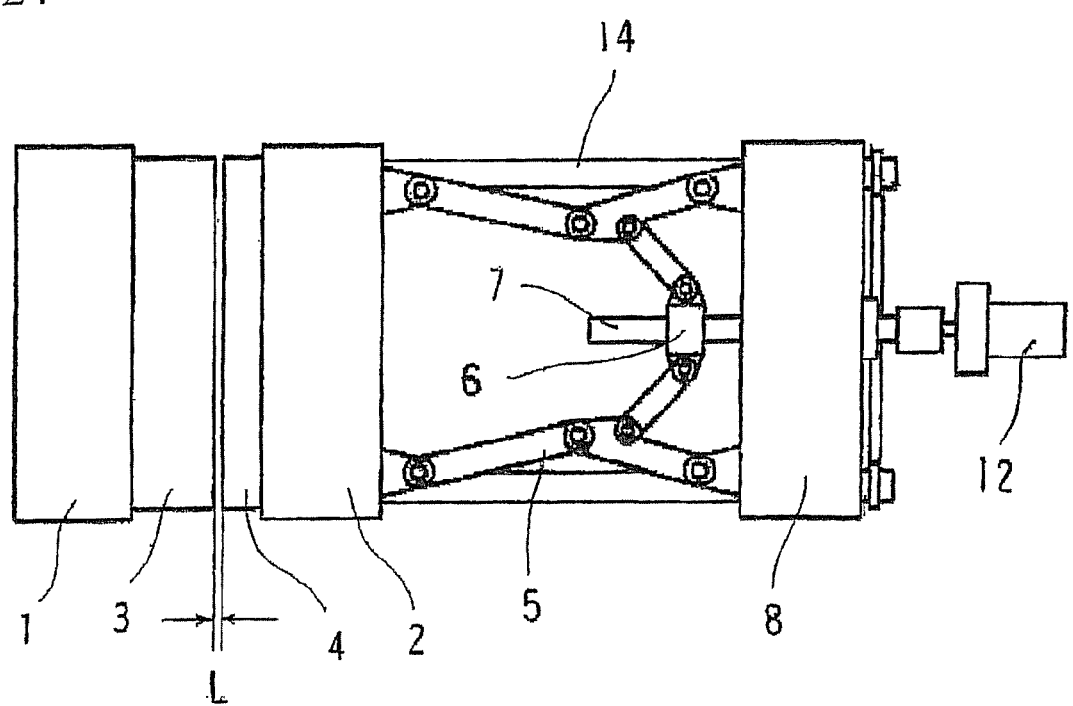
FIG. 24 is a plan view of a molding machine main body provided with a toggle link.

Besides, a molding machine main body as shown in FIG. 24 may also be used. In this example, the toggle link 5 is flexed by the motor-driven ball screw 7, and the movable die plate 2 is moved. That is, by driving of the motor 12, the motor-driven ball screw 7 inserted in the die tightening housing 8 is rotated, and the cross head 6 is moved, and the toggle link 5 is flexed. Owing to its characteristic tendency, the toggle link 5 moves the movable die plate 2 at high speed in initial phase of die tightening, and moves the movable die plate 2 at low speed near the die tightening limit, and it is preferable as the driving system of the movable die plate 2.

Figure 25:
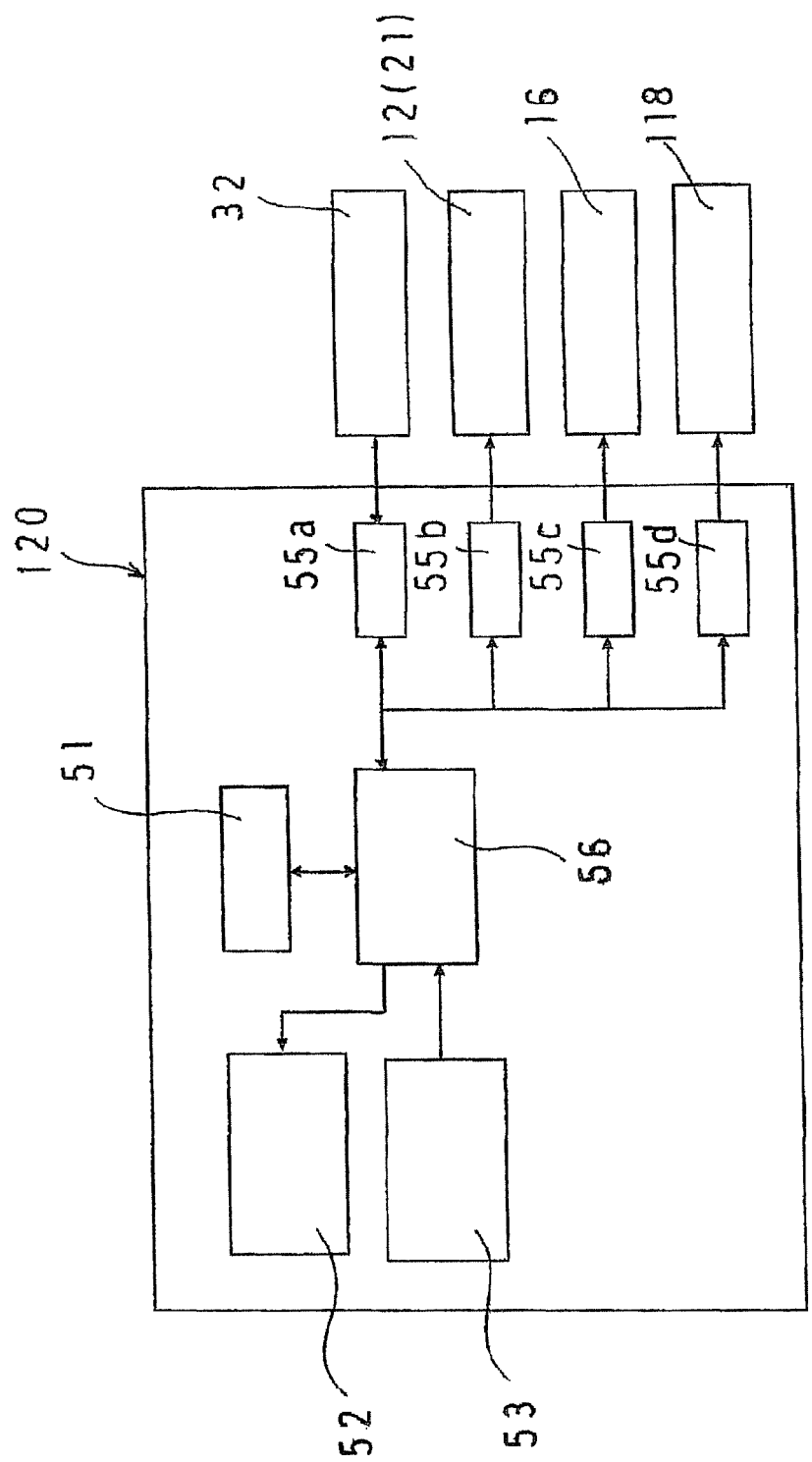
FIG. 25 is a principal structural diagram of a foamed resin molding machine.

FIG. 25 shows an entire configuration of the foamed resin molding machine. In the drawing, reference numeral 120 is a manufacturing process control device, and this control device 120 incorporates a CPU 56 and a memory 51 for storing the system program and the user program. The CPU 56 is connected to a monitor screen 52 for displaying the operation state of the molding machine main body, such as liquid crystal display, and a touch panel 53 including a keyboard. A position detector 151 such as rotary encoder is connected to the CPU 56 through an interface 55a, and this position detector 151 is connected to the motor 12 or motor 21, and detects the present position of the movable die plate 2. The motor 12 (21) is connected to the CPU 56 by way of an interface 55b, and start of driving, stop of driving, rotating speed and others are adjusted by the command from the CPU 56.

The CPU 56 also includes a material feeder 16 for filling the cavity 13 with material beads by compressed air, connected by way of an interface 55c, and also includes a supply and discharge mechanism 118 for supplying or discharging steam, air or water in the steam chambers of the fixed die 3 and movable die 4, connected by way of an interface 55d. Further, the CPU 56 may also be provided with a warning device (not shown) for alerting an abnormality.

The monitor screen 52 displays a part of the molding machine main body during idle operation, for example, in equal size or magnified size, showing only the portion of the formed cracking gap, or displays the movable die plate 2 in reduced size. Or in die tightening operation or die opening operation, the moving speed of the movable die plate 2 moving at low speed or high speed may be displayed by increasing or decreasing the number of digits of the moving speed, so that the molding program can be understood correctly.

The monitor screen 52 may display the checking results in equal speed, or fast feed or slow feed, or display the checking result of one cycle, in a list of cracking gap, air pressure, or molding parameters, or display the checking of the molding program accurately and easily.

The checking operation of the molding program is explained. First, monitor checking of idle operation is explained. The idle operation (or dry run) is an operation for checking the motion of the movable die plate 2 or the like by executing a command of molding program without filling with material and without actual production. That is, a dry run is specified from the touch panel 53, and the molding program is started, and all commands are executed except that the command for actual production is not issued.

The operator for checking watches the monitor screen 52 to monitor molding parameters, such as cracking stop position of movable die plate 2, high speed moving speed and low speed moving speed of movable die plate 2, discharge timing, discharge time and pressure of injection air in material filling process, and discharge timing, discharge time and pressure of steam, water and demolding air into the fixed die 3 and movable die in the molding process, and judges if the molding program is exactly as intended or not. If the molding program includes an error, such as deviation of cracking stop position, the error is corrected from the keyboard, and the monitor is checked again by dry run, and the molding program is reset to an initially intended scheme.

Instead of monitor check by dry run, the parameters can be checked by the monitor screen only without dry run, that is, without driving the molding machine main body at all. For this purpose, preferably, the touch panel 53 should be provided with a changeover switch.

Figure 26:
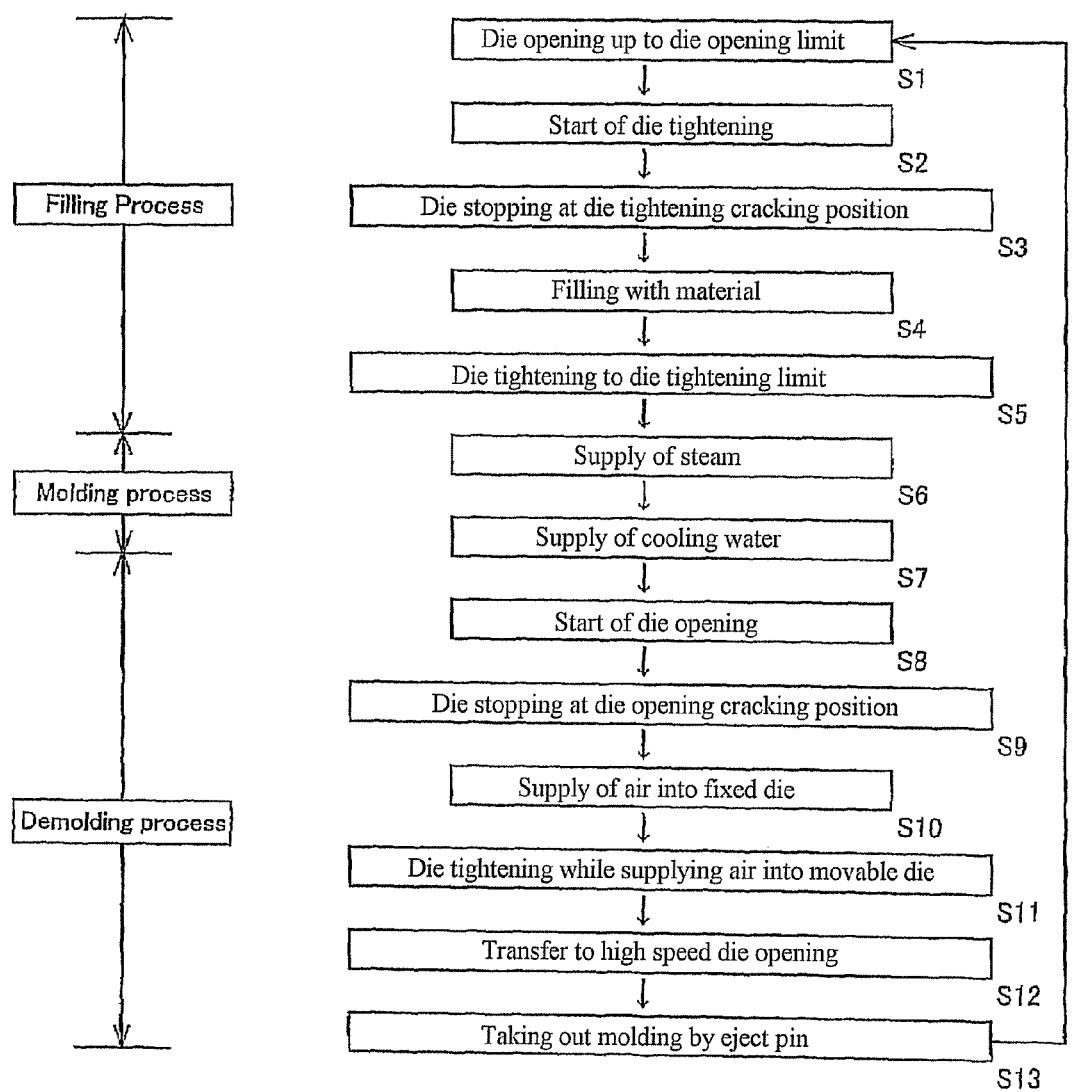
FIG. 26 is a flowchart of manufacturing process of a molding.

The monitor check may be followed by actual operation by selection on the touch panel 53. The process of actual operation is specifically described below in FIG. 26, by using the molding machine main body in the first embodiment.

First, the movable die plate 2 is opened to the die opening limit (S1), and the CPU 56 drives the motor 13, and the motor-driven ball screws 5, 6 are rotated at high speed. As a result, the position detector 151 detects the position of the movable die plate 2, and moves the movable die plate 2 at high speed toward the fixed die plate 1 (S2).

When the movable die plate 2 comes closer to the cracking stop position for starting to fill with material, the CPU 56 slows down the rotating speed of the motor 13, and the movable die plate 2 is moved at low speed, and stopped at the cracking stop position (S3). Injection air is blown into the material feeder 57, and material beads are sucked, and the material beads are sent into the cavity 13 (S4). At this time, by the command from the CPU 56, along with progress of filling, the motor 21 is driven, and the motor-driven ball screws 5, 6 are rotated at low speed, and filling with material beads while narrowing the cracking gap L. During filling, widening and narrowing of the cracking gap L are repeated, and the pressure of injection air is raised or lowered, and the cavity 13 is uniformly filled with material beads. As a result, when the cavity 13 is filled with a specified amount of material beads, the cracking gap L is completely closed, and the die is tightened to the die tightening limit (S5). After tightening the die, as required, more material beads are supplied, and feeding of material beads is stopped when the filling timer built in the CPU 56 counts up.

After filling with material beads, steam is supplied into the steam chambers of the fixed die 3 and movable die 4 from steam piping of the supply and discharge mechanism 118 (S6). When the steam supply timer counts up, supply of steam is stopped. The material in the cavity 13 is expanded and fused. Cooling water is supplied into the fixed die 3 and movable die 4 from the water feed piping of the supply and discharge mechanism 59, and water supply is stopped when the water feed timer counts up (S7). The expanded material is cooled and caked, and molding is completed.

After molding, the die begins opening at low speed (S8), and the movable die plate 2 is stopped at cracking stop position when the die is opened by 2 to 3 mm from the die tightening limit. At this time, simultaneously with start of die opening, a demolding air is supplied into the steam chamber of the fixed die 3, and the die is opened (S10), and the molding is lifted by air, and is transferred to the movable die 4 side. Next, while passing demolding air into the steam chamber of the movable die 4, the die is tightened at medium speed to the cracking stop position of demolding die tightening (S11), and die tightening is stopped, and the molding is transferred to the fixed die 3. Then, while opening the die at high speed (S12), the molding is pushed out by the eject pin 16 (S13), and the molding is dropped down and taken out.

The movable die plate 2 is opened again to the die opening limit (S1), and the process after S2 is repeated and operated automatically. The process of the actual operation above is substantially same as the process of the dry run when not filled with material as in the actual operation.

In the midst of actual production, if an abnormal position exceeding the limit occurs between the set value and actual value of the cracking stop position, an alarm is issued from the warning device or a command is issued from the CPU 56, and the operation is stopped, and, preferably, occurrence of massive defectives should be avoided.

When using the molding machine main body of the second embodiment, the dry run is selected on the touch panel 53, and the movable die plate 2 is moved to the cracking stop position by dry run on the monitor screen 52, and after checking the precision of molding parameters such as moving speed of movable die plate 2 or cracking stop position, and by changing over on the touch panel 53, the molding can be automatically produced in actual production in the same process.

As mentioned above, by moving the movable die to the cracking stop position on the monitor screen of dry run, after checking the molding parameters such as precision of cracking stop position or moving speed of movable die, and by changing over on the touch panel 53, the molding can be automatically produced in actual production, and moldings free from defects can be manufactured stably. By adjusting the three points, that is, the position of movable die plate 2, air pressure of injection air and demolding air, and increase or decrease of moving speed of movable die plate 2, a favorable molding condition depending on the depth, shape and demolding property of the mold can be reproduced and applied repeatedly in every molding cycle.

In conventional filling process, the pressure of the injection air was kept at a specific value, but in the foamed resin molding machine of the invention, corresponding to the position of the movable die plate 2 form the cracking stop position, it can be changed in multiple steps or continuously, and the cavity 13 may be uniformly filled with material beads.

In the conventional demolding process, the pressure of the demolding air was kept at a specific value, but in the foamed resin molding machine of the present invention, corresponding to the position and speed of die opening, it can be changed in multiple steps or continuously increase, and the molding can be demolded smoothly without causing demolding failures. Therefore, the present invention is capable of manufacturing moldings stably while preventing occurrence of defects, and is outstanding in the advantage.

The invention claimed is:

1. An operating method for a foamed resin molding machine, comprising:
   providing a foamed resin molding machine including:
   a fixed die plate having a fixed die, a movable die plate having a movable die, and a die opening and closing device for opening and closing the movable die plate on the fixed die plate, wherein the die opening and closing device is composed of a toggle link disposed reversely between the movable die plate and a die tightening housing
   die thickness adjusting means for moving the die tightening housing and adjusting for a thickness of the tightened die,
   a cross head for bending and expanding the toggle link, and a motor-driven ball screw penetrating through the die tightening housing to be screwed into the cross head
   ball screw rotation control means for controlling a cracking gap and stopping the movable die at a cracking gap position when tightening and opening the die,
   wherein the cracking gap position is defined by a constant width parallel clearance between the fixed and movable die, and wherein the cracking gap position forms an exit route for air to escape at a constant air pressure, a cavity formed internal to the fixed and movable dies after the die is tightened to a die tightening limit, means for filling said cavity with material and applying steam through piping to the fixed and movable dies for a predetermined time period to expand and fuse the material in said cavity, and means for supplying cooling water through the piping to cool and solidify the material in said cavity, predetermining the die thickness by moving the die tightening housing by the die thickness adjusting means corresponding to the thickness of the tightened die, measuring the die tightening force at a-the die tightening limit, finely adjusting the die thickness by the die thickness adjusting means on the basis of the measured result, and once opening the die and then tightening the die again, by controlling the expansion of the toggle link by the ball screw rotation control means, thereby controlling the cracking gap position at the-a time of filling said cavity with materials and at a time of releasing the solidified material from said cavity, and wherein the die tightening limit is between 30 to 70% of the die tightening force realized during actual molding.

2. The operating method of the foamed resin molding machine according to claim 1, further comprising the steps of:

controlling the flexure of a toggle link by ball screw rotation control means while blowing air into the fixed die, opening the movable die to the demolding die opening cracking gap position, lifting the molding by air to transfer the molding to the movable die, controlling the expansion of the toggle link by ball screw rotation control means while blowing air into the movable die, tightening the movable die to the demolding die tightening cracking gap position, lifting the molding by air to transfer the molding to the fixed die, and pushing and dropping the molding by an eject pin while opening the die.

3. The operating method of the foamed resin molding machine according to claim 1, further comprising the steps of:

moving the die tightening housing by the die thickness adjusting means to a die tightening limit, and measuring the die tightening force wherein when the die is tightened to a die tightening limit that is not within a specified target value, the die tightening housing is again moved by the die thickness adjusting means until the die tightening force is set within a specified range.

4. The operating method of the foamed resin molding machine according to claim 1, further comprising providing a molding process control means which has a touch panel for changing between an idle operation for checking a molding process program on a monitor screen by displaying molding parameters of the molding program, and an actual operation for producing the moldings automatically.

5. The operating method of the foamed resin molding machine according to claim 4, wherein the idle operation of the molding process control means is selected by the touch panel, and checking a moving speed of the movable die plate by driving of the motor-driven ball screw, and a cracking stop position of the movable die plate by stopping of the motor-driven ball screw on the monitor screen for checking the molding program, and discharging an injection air for material supply and a demolding air, and checking at least an air discharge timing, discharge time, and pressure.

\* \* \* \* \*